(12) United States Patent
Davis et al.

(10) Patent No.: US 10,783,460 B1
(45) Date of Patent: Sep. 22, 2020

(54) COMPUTER GENERATION OF ITINERARIES

(71) Applicant: Amazon Technologies, Inc., Seattle, WA (US)

(72) Inventors: Wesley Shawn Davis, Seattle, WA (US); Damien Renaud Leake, Seattle, WA (US); Anshu Kumar Mishra, Issaquah, WA (US); Gregory Forrest Wright, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 755 days.

(21) Appl. No.: 14/969,545

(22) Filed: Dec. 15, 2015

(51) Int. Cl.
*G06Q 10/02* (2012.01)
*G06Q 50/14* (2012.01)

(52) U.S. Cl.
CPC ......... *G06Q 10/025* (2013.01); *G06Q 50/14* (2013.01)

(58) Field of Classification Search
CPC .................................................. G06Q 10/025
See application file for complete search history.

(56) References Cited

U.S. PATENT DOCUMENTS

| | | | | |
|---|---|---|---|---|
| 9,179,192 B1* | 11/2015 | Ning | ............... | G06F 16/7867 |
| 2002/0035555 A1* | 3/2002 | Wheeler | ........... | G06F 17/30289 |
| 2003/0229446 A1* | 12/2003 | Boscamp | ............... | G01C 21/26 |
| | | | | 701/469 |
| 2005/0010567 A1* | 1/2005 | Barth | ................ | G06F 17/30867 |
| 2007/0073562 A1* | 3/2007 | Brice | ..................... | G06Q 10/02 |
| | | | | 705/5 |
| 2008/0030376 A1* | 2/2008 | Tunnell | .................. | G07C 5/085 |
| | | | | 340/988 |
| 2009/0157664 A1* | 6/2009 | Wen | ..................... | G06Q 10/047 |
| 2009/0313055 A1* | 12/2009 | Martin | ................... | G06Q 10/02 |
| | | | | 705/6 |
| 2010/0280748 A1* | 11/2010 | Mundinger | ......... | G06Q 10/047 |
| | | | | 701/532 |
| 2011/0066588 A1* | 3/2011 | Xie | .......................... | G06N 5/02 |
| | | | | 706/58 |
| 2014/0108070 A1* | 4/2014 | Vernitsky | ............. | G06Q 10/025 |
| | | | | 705/6 |
| 2014/0279261 A1* | 9/2014 | Krishna Kolluri | ...... | G06T 7/11 |
| | | | | 705/26.63 |

(Continued)

OTHER PUBLICATIONS

Yamada et al., "Extracting Local Event Information from Microblogs for Trip Planning," 2015 Eighth International Conference on Mobile Computing and Ubiquitous Networking (ICMU), Institute of Electrical and Electronics Engineers Inc., Jan. 1, 2015, pp. 7-12.*

*Primary Examiner* — Nathan Erb
(74) *Attorney, Agent, or Firm* — Lee & Hayes, P.C.

(57) ABSTRACT

A community driven framework for travel planning is described. A service provider may determine an intended travel destination associated with a user and may access, from a database, candidate itineraries that are associated with the intended travel destination. The service provider may determine a suitability score associated with a candidate itinerary of the candidate itineraries, the suitability score indicating a likelihood that the candidate itinerary is of interest to the user. The service provider may select the candidate itinerary as an itinerary to recommend to the user and may cause the itinerary to be presented to the user via a device corresponding to the user.

20 Claims, 7 Drawing Sheets

(56) References Cited

U.S. PATENT DOCUMENTS

| | | | |
|---|---|---|---|
| 2014/0310268 A1* | 10/2014 | Rosenstock | G06F 16/29 707/724 |
| 2015/0073929 A1* | 3/2015 | Psota | G06Q 50/28 705/26.2 |
| 2015/0134378 A1* | 5/2015 | Van Doren | G06Q 10/02 705/6 |
| 2016/0078502 A1* | 3/2016 | Sedky | G06Q 10/02 705/347 |
| 2016/0171395 A1* | 6/2016 | Lippow | G06Q 10/025 705/6 |

* cited by examiner

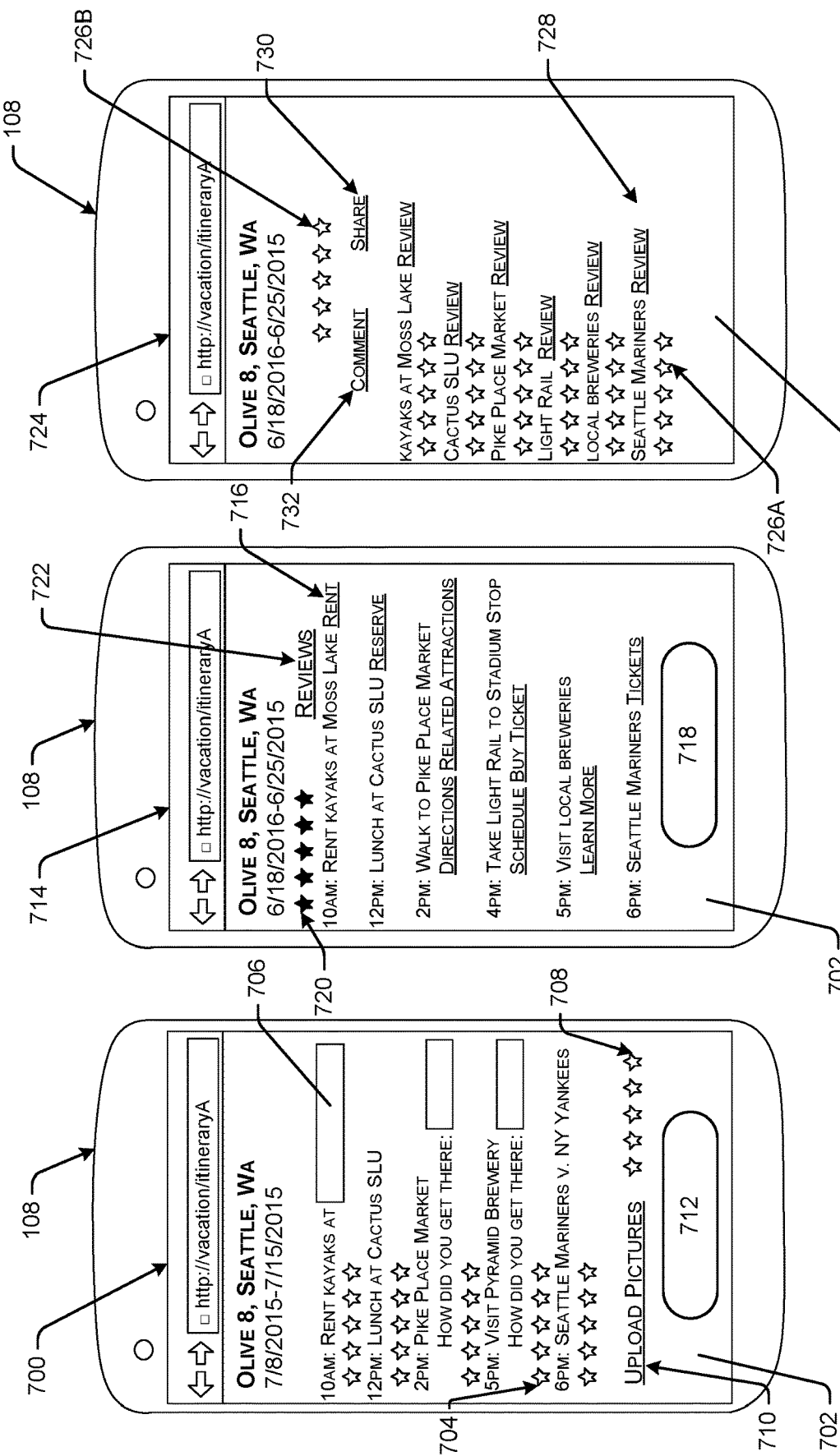

COMPUTER GENERATION OF ITINERARIES

BACKGROUND

Modern computing technologies enable users to access resources that are available over networks, such as the Internet, to assist with travel planning (e.g., online travel search services, online travel reservation services, online publications associated with travel, etc.). Generally, available resources are generic, such that they present the same information for all users. As a result, users may access, generic, non-customized information, which may not be consistent with the interests or preferences of the users. The users may be required to spend a significant amount of time reviewing resources that are available. Additionally, the users may engage in a significant amount of interaction with various user interfaces that are configured to present the resources to the users. Furthermore, the number of resources that are available is so large that the time and interaction required to review the resources can be computationally intensive and inefficient.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 7A is a diagram showing an example user interface that may be presented via a display of a device associated with a user to receive user input associated with partial itinerary.

FIG. 7B is a diagram showing an example user interface that may be presented via a display of a device associated with a user to present an itinerary to the user.

FIG. 7C is a diagram showing an example user interface that may be presented via a display of a device associated with a user to receive user feedback regarding an itinerary recommended to the user.

DETAILED DESCRIPTION

Figure 1:
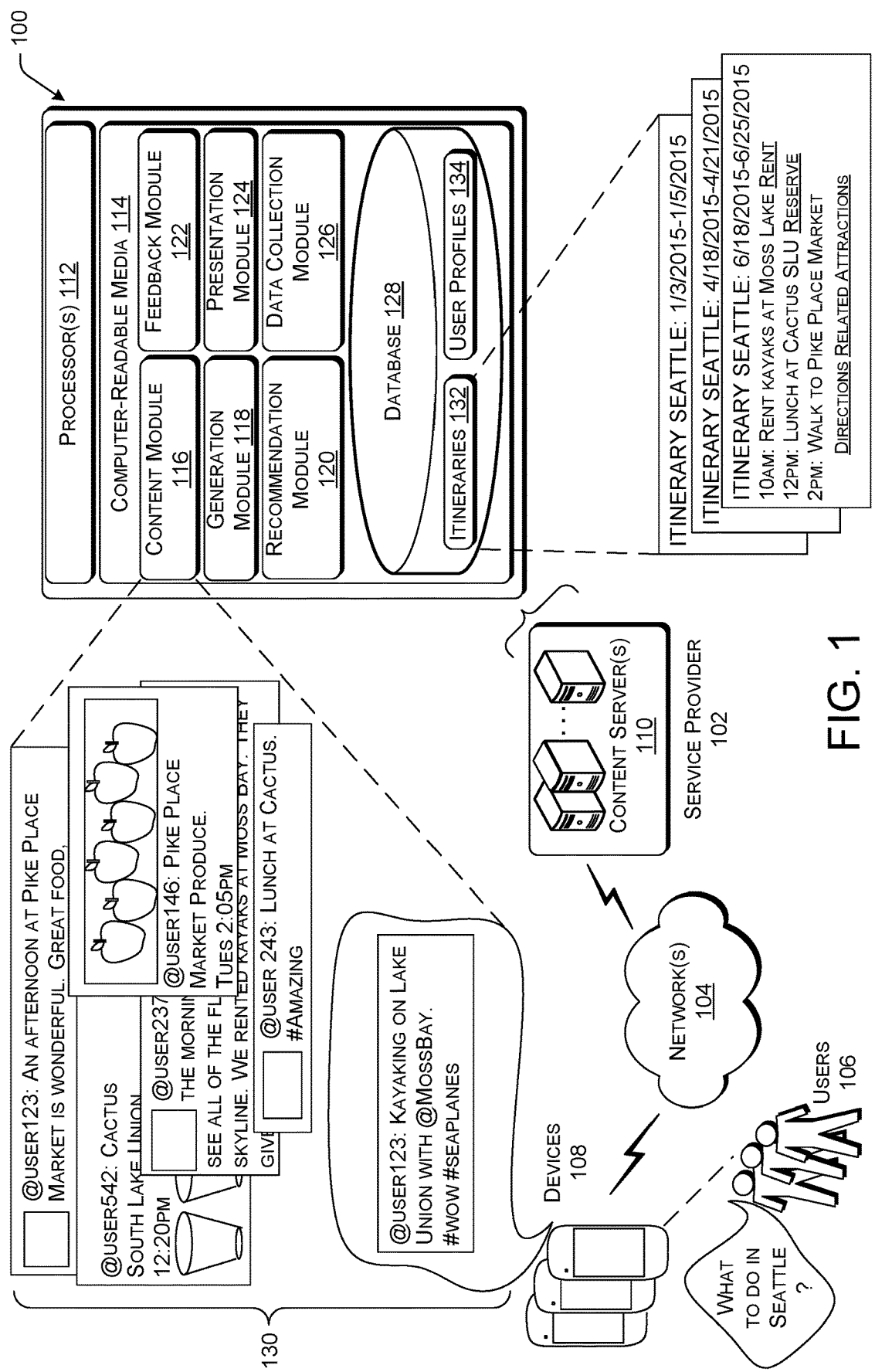
FIG. 1 is a diagram showing an example system for accessing content items created by users to determine itineraries for particular travel destinations.

This disclosure describes a community driven framework on which one or more applications associated with travel planning may be run to generate and/or recommend itineraries. Techniques described herein leverage content items created by users while visiting travel destinations to determine itineraries for particular travel destinations. For the purpose of this discussion, content items include images, videos, social media posts (e.g., FACEBOOK® status update, INSTAGRAM® photo, SNAPCHAT® story, etc.), microblog posts (e.g., TWITTER® TWEET®, TUMBLR®, etc.), blog posts (e.g., BLOGGER®, WORDPRESS®, etc.), etc. A service provider may access the content items, process the content items, and determine information associated with the content items. For instance, the information may include a geographic location where the content item was generated, a date and/or time the content item was generated, content associated with the content item, etc. Based on this information, the service provider may generate an itinerary associated with a travel destination. The itinerary may include one or more attractions associated with a travel destination. For the purpose of this discussion, an attraction may be a place to visit at or near the travel destination such as a restaurant, a national park, a theme park, a landmark, a tour, a resort, etc., an activity to do at or near the travel destination such as a sightseeing activity, a sporting event, a concert, etc. The itinerary may also include a route that may include an order for traveling to each of the one or more attractions, an amount of time to spend at each of the one or more attractions, etc. In additional and/or alternative examples, the itinerary may include routes around or within the attractions.

As a non-limiting example, a user may travel to Seattle, Wash. While in Seattle, the user may take images or videos of attractions in Seattle, post via their social media accounts describing attractions in Seattle, post via their microblogging accounts recounting their experiences in Seattle, etc. The service provider may access the images, videos, social media posts, microblog posts, etc. to determine the geographic locations associated with the content items, the date and/or time the content items were generated, what is depicted or described in the content items, etc. Based at least in part on the geographic locations, date and/or time, and content of the content items, the service provider may identify one or more attractions visited by piecing together a route taken by the user during his or her travel to Seattle. As described above, the route may refer to the order of travel between attractions. For instance, a non-limiting example of an itinerary may be:

10:00 AM Kayak on Lake Union
    12:00 PM Lunch as Cactus in South Lake Union
    2:00 PM Pike Place Market
    5:00 PM Pyramid Brewery
    6:00 PM Seattle Mariners v. New York Yankees at Safeco Field.

When a user who is a part of the community of users makes reservations for accommodations or provides other indications of an intent to travel to a particular destination, the service provider may recommend itineraries corresponding to the particular destination to the user. For the purpose of this discussion, accommodations may refer to hotels, lodges, bed and breakfasts, vacation rentals, RV parks, camp sites, etc.

Recommending itineraries to users may reduce the inconvenience of researching attractions to visit during a user's visit to an unfamiliar destination. The recommendations enable a streamlined process for sorting through the massive amounts of travel options presented by modern computing technologies to generate itineraries that may be presented via user interfaces to users in the community. The recommendations may mitigate the complexity and time intensive travel planning that modern computing technologies have caused. That is, the user interfaces configured to present the itineraries and corresponding recommendations may improve user efficiency with respect to reviewing the travel options presented via modern computing technologies and may reduce the interaction presently required between users and modern computing technologies. As a result, the technologies described herein may conserve computing resources.

Using the non-limiting example described above, based at least in part on determining that a user reserves a hotel room in Seattle, Wash. or provides other indications that the user is travelling to Seattle, the service provider may provide the itinerary to the user (assuming the itinerary is likely to be of interest based on characteristics of the user, as described below). As such, the user may be able to visit several great attractions in Seattle without investing a significant amount of time into planning his or her itinerary. That is, the user may benefit from other users in his or her community providing content items while visiting Seattle that may be used to generate itineraries including one or more Seattle attractions.

The service provider may also provide technologies for enabling the users to offer structured reviews of the itineraries and attractions associated with the itineraries. The structured reviews may be utilized to improve the itineraries and the recommendation process described herein. That is, users who are a part of the community may leverage feedback corresponding to itineraries from other members of the community to help them decide whether to accept an itinerary that is recommended to them. Again, using the non-limiting example described above, at some time after the user is presented the itinerary, the service provider may solicit reviews and/or ratings from the user to determine feedback for improving the Seattle itinerary.

FIG. 1 is a diagram showing an example system 100 for accessing content items generated by users to determine itineraries for particular travel destinations. More particularly, the system 100 may include a service provider 102, one or more network(s) 104, users 106, and devices 108 associated with the users 106.

The service provider 102 may be any entity, server(s), platform, etc., that provides items (e.g., products, services, etc.) to users 106 (e.g., consumers) on behalf of other users 106 (e.g., merchants) and/or the service provider 102. The service provider 102 may be implemented in a non-distributed computing environment or may be implemented in a distributed computing environment, possibly by running some modules on devices 108 or other remotely located devices. As shown, the service provider 102 may include one or more content server(s) 110, which may include one or more processor(s) 112 and computer-readable media 114. The content server(s) 110 may also include additional components not listed above that may perform any function associated with the content server(s) 110. In various embodiments, each of the content server(s) 110 may be any type of server, such as a network-accessible server.

As shown, the service provider 102 may include one or more content server(s) 110, which may include one or more processor(s) 112 and computer-readable media 114. In various examples, the processor(s) 112 may execute one or more modules and/or processes to cause the content server(s) 110 to perform a variety of functions, as set forth above and explained in further detail in the following disclosure. In some embodiments, the processor(s) 112 may include a central processing unit (CPU), a graphics processing unit (GPU), both CPU and GPU, or other processing units or components known in the art. Additionally, each of the processor(s) 112 may possess its own local memory, which also may store program modules, program data, and/or one or more operating systems.

In at least one configuration, the computer-readable media 114 of the content server(s) 110 may include one or more modules and data structures including, for example, a content module 116, a generation module 118, a feedback module 122, a recommendation module 120, a presentation module 124, a data collection module 126, and a database 128. The one or more modules and data structures may be in the form of stand-alone applications, productivity applications, an operating system component, or any other application or software module having features that facilitate interactions between the user devices 108 and the service provider 102. Depending on the exact configuration and type of the content server(s) 110, the computer-readable media 114 may also include volatile memory (such as RAM), non-volatile memory (such as ROM, flash memory, miniature hard drive, memory card, or the like), or some combination thereof.

In various examples, the service provider 102 may present items to consumers on behalf of itself, merchants, etc. The items may include products, services, etc. For the purpose of this discussion, the products, services, etc. may include, but are not limited to, travel related products and/or services such as flights, hotel rooms, rental cars, admission to attractions, itinerary recommendations, etc. In some examples, the service provider 102 may cause a user interface to be presented that promotes or features a combination of items offered by the service provider 102 or the merchants (i.e., an itinerary). As described above, the service provider 102 may access content items 130, process the content items 130, and determine information associated with the content items 130. Based at least in part on information determined from the content items 130, the service provider 102 may generate an itinerary 132 associated with a travel destination. As described above, an itinerary 132 may include a plurality of attractions and a route for travelling to each attraction of the plurality of attractions. Furthermore, based at least in part on determining that a consumer makes reservations for accommodations or provides other indications of an intent to travel to a particular destination (i.e., intended travel destination), the service provider 102 may recommend an itinerary 132 associated with the particular destination to the consumer. The service provider 102 may also provide technologies for enabling the consumers to offer structured reviews of the itineraries 132 and attractions associated with the itineraries 132.

As described above, in at least one configuration, the computer-readable media 114 of the content server(s) 110 may include one or more modules and data structures including, for example, the content module 116, the generation module 118, the feedback module 122, the recommendation module 120, the presentation module 124, the data collection module 126, and the database 128. The content module 116 may access and/or receive content items 130. The generation module 118 may generate itineraries 132 based at least in part on the content items 130. The recommendation module 120 may determine itineraries 132 to recommend to consumers. Additional details associated with the content module 116, the generation module 118, and the recommendation module 120 are described below in the context of FIG. 2.

The feedback module 122 may access, receive, and/or determine feedback associated with attractions and/or itineraries 132. The feedback module 122 may receive feedback data from consumers. Consumers may provide feedback via a self-service website, application, or browser on a device 108, customer service, etc. Consumers may provide feedback relevant to previously recommended and/or acquired items, preferences, interests, likes/dislikes, complaints, etc. For instance, feedback data may include a type of feedback (e.g., positive, neutral, negative) and may include feedback provided directly from consumers, user ratings relating to items, attractions, itineraries, and/or merchants, user reviews of items, attractions, itineraries, and/or merchants, user responses to surveys and/or questionnaires, customer service feedback, information from sites (i.e., websites), and so on. In some examples, the feedback data may be express feedback data, for instance, feedback provided directly from consumers, user ratings relating to items, attractions, itineraries, and/or merchants, user reviews of items, attractions, itineraries, and/or merchants, user responses to surveys and/or questionnaires, customer service feedback, information from sites (i.e., websites), and so on. In other examples, the feedback data may be implied feedback data. For instance, as described below, a consumer may share an itinerary with other consumers in his or her social network, etc. Such a user interaction may be indicative that the consumer liked the itinerary and may be determined to be positive feedback associated with the shared itinerary. Or, a consumer may tag one or more other consumers in a review or comment associated with an itinerary. Such a user interaction may be indicative that the consumer liked the itinerary and may be determined to be positive feedback associated with the itinerary.

The presentation module 124 may generate user interfaces and cause the user interfaces to be presented to consumers via displays on devices corresponding to the consumers. In alternative examples, modules other than the presentation module 124 may generate the user interfaces and/or content to be included in the user interfaces and the presentation module 124 may cause the user interfaces to be presented via displays of devices 108. The presentation module 124 may cause user interfaces configured to present partial itineraries to consumers for input and/or feedback, user interfaces configured to present completed itineraries to consumers, and/or user interfaces configured to receive feedback about the completed itineraries from consumers to be presented to consumers.

In at least one example, the presentation module 124 may generate a user interface configured to receive input and/or feedback associated with partial itineraries from consumers, as described below in FIG. 7A. The presentation module 124 may cause partial itineraries to be presented to a consumer in predetermined time intervals, at a predetermined frequency, on or before a date and/or time, etc. In additional and/or alternative examples, the presentation module 124 may generate user interfaces configured to recommend an itinerary 132 to a consumer and the presentation module 124 may cause the user interfaces to be presented to the consumer via a display of a device 108. In some examples, the user interfaces may be configured to provide functionality for the consumer to view a recommended itinerary and/or acquire the one or more items associated with the recommendation, as described below in FIG. 7B. Additionally and/or alternatively, the presentation module 124 may cause the user interfaces to be presented to the consumer via a text message, an email, a push notification, etc. The presentation module 124 may cause user interfaces to be presented to a consumer in predetermined time intervals, at a predetermined frequency, on or before a date and/or time, etc. Furthermore, the presentation module 124 may generate a user interface configured to receive input and/or feedback associated with previously recommended itineraries 132, as described below in FIG. 7C. The presentation module 124 may cause the user interface configured to receive input and/or feedback to be presented to a consumer in predetermined time intervals, at a predetermined frequency, on or after a date and/or time, etc.

The data collection module 126 may access, receive, and/or determine data associated with consumers. The data collection module 126 may receive data from the users 106 (e.g., merchants, consumers, etc.), the service provider 102, etc. In at least one example, the data collection module 126 may receive information associated with consumers such as user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.). Additionally or alternatively, the data collection module 126 may access and observe user information and user actions associated with third party sources and systems (e.g., social networks, professional networks, partner webstore purchases, etc.). The data corresponding to the user information and/or user actions may be mapped to a user profile corresponding to a consumer that may be stored in the database 128, cloud storage system, or other data repository.

The database 128 may store data that is organized so that it may be accessed, managed, and updated. In at least one example, the database 128 may include data associated with individual consumers that may be arranged in user profiles 134. A user profile 134 may correspond to a retail purchase account associated with the service provider 102. A user profile 134 may have various data items associated with consumers, as described above, which may be mapped to the user profile 134. For instance, in some examples, a user profile 134 may be mapped to data associated with a consumer such as user information and user actions associated with a retail purchase account associated with a consumer, user information and user actions associated with third party sources and systems, feedback data, etc.

Additionally and/or alternatively the database 128 may include one or more itineraries 132. In at least one example, the database 128 may include a plurality of itineraries 132 that may be organized by destination. In some examples, individual itineraries 132 of the one or more itineraries 132 may be mapped to destinations with various levels of granularity. For instance, a first level of granularity may be the most inclusive and subsequent levels of granularity may be increasingly exclusive. That is, a first level of granularity may include a plurality of itineraries associated with a destination having the first level of granularity and subsequent levels of granularity may have fewer itineraries based at least in part on the subsequent levels of granularity being less broad (i.e., more specific) than the first level of granularity. As a non-limiting example, the first level of granularity may be a state and may include a subset of the plurality of itineraries 132 that correspond to attractions in the state. A subsequent level of granularity may be a city and may include a subset of the plurality of itineraries 132 that correspond to attractions in the city (excluding the other itineraries 132 associated with other cities in the state).

In some examples, the network(s) 104 may be any type of network known in the art, such as the Internet. Moreover, the service provider 102 and/or the devices 108 may communicatively couple to the network(s) 104 in any manner, such as by a wired or wireless connection. The network(s) 104 may facilitate communication between the content server(s) 110 and/or the devices 108 associated with the users 106.

The users 106 (e.g., consumers, merchants, etc.) may interact with the service provider 102 via a site (i.e., a website), a self-service merchant portal, a self-service interface, or in any other manner.

In at least one example, consumers may interact with the service provider 102 to acquire one or more items that are offered for acquisition and/or reservation on behalf of the merchants and/or the service provider 102. In some examples, the service provider 102 may generate and present user interfaces for presenting one or more items to a consumer. For the purpose of this discussion, such user interfaces may be called item pages. Item pages may display an item and information about the item. In at least one example, item pages may include recommended itineraries and/or mechanisms that may be actuated to cause recommended itineraries to be presented to a user 106. In various examples, a consumer may acquire an item or reserve an item by actuating a control on a user interface presented on a display of a device 108 to acquire or reserve the item. The control may be associated with a hyperlink or an overlay that directs the consumer to a new user interface and prompts the consumer to input information for purchasing or reserving the item (e.g., banking information, etc.). In at least one example, based at least in part on purchasing or reserving the item over the computer network, the consumer may receive information to access the item upon arrival at the intended travel destination and/or receive the item via physical mail, email, etc. For instance, based at least in part on a consumer making reservations for accommodations via an item page, the consumer may receive a confirmation number so that the consumer may access the accommodations upon arrival. Or, based at least in part on a consumer purchasing tickets to a sporting event via an item page, the consumer may receive tickets to the sporting event in his or her email or via physical mail.

In at least one example, merchants may interact with the service provider 102 to offer one or more items for acquisition or use by consumers. In various examples, the merchants may be any individual or entity that is a source or a distributor of items that may be acquired or used by the consumers. For example, the merchants may include entities that provide products or services to consumers, which may be offered or promoted directly by the merchants or by the service provider 102 or on behalf of the merchants. The merchants may also offer those items via a physical location (e.g., a brick-and-mortar store), a merchant-branded merchant site (e.g., website), an intermediary marketplace, etc. The merchants may provide items to the consumers with the assistance of one or more devices 108, which may include any type of device.

In some examples, the users 106 may operate corresponding devices 108 to perform various functions associated with the devices 108, which may include at least some of the operations and/or modules discussed above with respect to the service provider 102.

Figure 2:
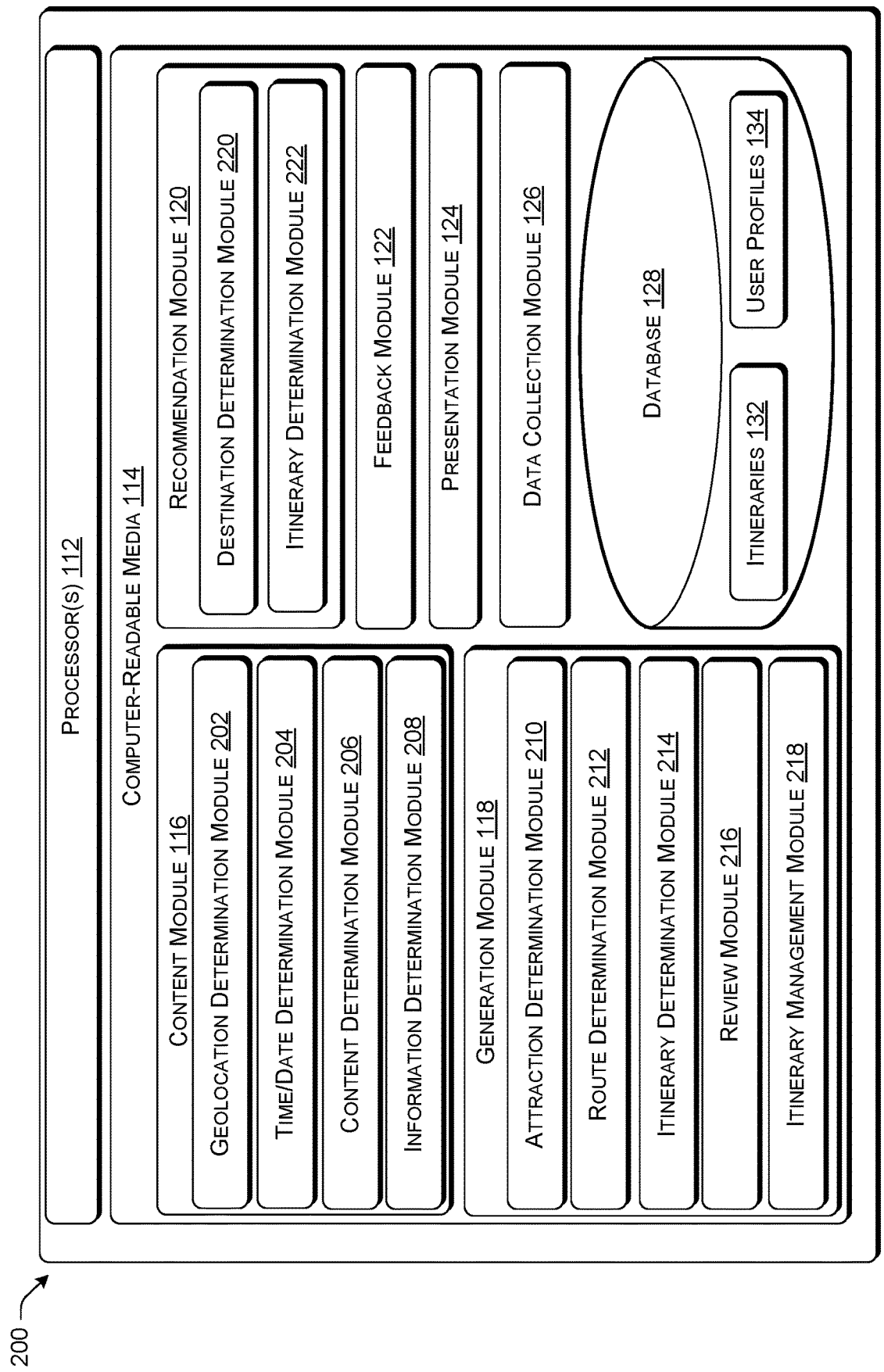
FIG. 2 is a diagram showing additional details associated with an example system for accessing content items created by users to determine itineraries for particular travel destinations.

FIG. 2 is a diagram showing additional details of the example system 100 for accessing content items 130 generated by users 106 to determine itineraries 132 for particular travel destinations.

As described above, the computer-readable media 114 of the content server(s) 110 may include one or more modules and data structures including, for example, the content module 116, the generation module 118, the feedback module 122, the recommendation module 120, the presentation module 124, the data collection module 126, and the database 128.

The content module 116 may access and/or receive content items 130. As described above, content items 130 include images, videos, social media posts (e.g., FACEBOOK® status update, INSTAGRAM® photo, SNAPCHAT® story, etc.), microblog posts (e.g., TWITTER® TWEET®, TUMBLR®, etc.), blog posts (e.g., BLOGGER®, WORDPRESS®, etc.), etc. The content module 116 may include modules for processing the content items 130 and/or accessing, receiving, and/or determining additional information associated with content items 130. For instance, the content module 116 may include a geolocation determination module 202, a time/date determination module 204, a content determination module 206, an information determination module 208, etc.

In some examples, the content items 130 may be accessed from public sources (e.g., public FACEBOOK® posts, public INSTAGRAM® accounts, public PINTEREST®, etc.). In other examples, the content items 130 may be accessed from private sources (e.g., private FACEBOOK® posts, private INSTAGRAM® accounts, private PINTEREST®, private storage repositories, etc.). In the examples where the content items 130 are associated with private sources, a consumer may be provided with notice that the systems and methods herein are accessing the content items 130 from the private sources. Additionally, prior to accessing images associated with private sources, consumers may have an opportunity to opt-in or opt-out of allowing the service provider 102 to access their content items 130 that are associated with private sources. For example, consumers may opt-in by taking affirmative action indicating that he or she consents to allowing the service provider 102 to access his or her content items 130 that are associated with private sources. Alternatively, consumers may be presented with an option to opt-out. An opt-out option may require an affirmative action to opt-out of allowing the service provider 102 to access content items 130 that are associated with private sources, and in the absence of affirmative user action to opt-out, access to content items 130 that are associated with private sources may be impliedly permitted.

In some examples, the content items 130 may be generated by a consumer via a device 108 associated with the consumer. In other examples, the content items 130 may be generated by someone other than the consumer (e.g., a friend of the consumer, a family member of the consumer, etc.) via a device 108 associated with the person other than the consumer. In such examples, the person other than the consumer may tag the consumer or otherwise indicate that the content item 130 is associated with the consumer, even though the consumer and/or device 108 associated with the consumer did not generate the content item 130.

The content items 130 may be associated with metadata. Metadata may include technical metadata, descriptive metadata, administrative metadata, etc. Technical metadata may include data associated with a generation of the content item 130. For instance, for image or video content items 130, technical metadata may include image or video capturing details and settings, image or video capturing device brand and model, date and time that the image or video was captured, and/or Global Positioning System (GPS) location (i.e., geotags) where the image or video was captured (as determined by geolocation devices). For other content items 130 (e.g., social media posts, microblog posts, blog posts, etc.), the technical metadata may include data associated with a date and time that a post was published and/or Global Positioning System (GPS) location (i.e., geographic location) where the post was published (as determined by geolocation devices). Descriptive metadata may include a name of a content item 130 creator, keywords related to the content item 130, captions, titles, comments, etc. Keywords may identify one or more subjects associated with the content item 130, objects associated with the content item 130, activities associated with the content item 130, geographical locations associated with the content item 130, landmarks associated with the content item 130, events associated with the content item 130, etc. Administrative metadata may include various rights, restrictions on use, contact information for an owner of the content item 130, etc. In some examples, metadata may be inherent to the content items 130. That is, in some examples, devices 108, applications, etc. may automatically generate metadata and associate the metadata with the content items 130. In other examples, the metadata may be added to the content items 130 by consumers (e.g., a consumer may tag their location and/or other people in a photo when posting the photo to INSTAGRAM® or a post to FACEBOOK®).

The geolocation determination module 202 may determine geographic locations (e.g., geolocation data) associated with content items 130. In at least one example, the geolocation determination module 202 may leverage explicit information to determine geographic locations. For instance, the geolocation determination module 202 may utilize metadata associated with content items 130 to determine a geographic location associated with where a content item 130 was published, a geographic location referred to in the content items 130, or a geographic location otherwise associated with the content items 130, etc. In some examples, the geolocation determination module 202 may prompt a consumer for geographic location information. In other examples, the geolocation determination module 202 may infer geographic locations associated with content items 130. For instance, the geolocation determination module 202 may utilize data output by the content determination module 206, described below, to infer geographic locations associated with the content items 130. Or, the geolocation determination module 202 may leverage information associated with consumers such as user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with mapping applications (e.g., maps requests, directions requests, etc.), user information and user actions associated with third party sources and systems (e.g., social networks, professional networks, partner webstore purchases, etc.), etc. to infer geographical locations associated with the content items 130.

In at least one example, the geolocation determination module 202 may leverage the geolocation data and/or the content data output by the content determination module 206, described below, to determine whether a content item 130 is associated with a known attraction such as a state park, national park, landmark, restaurant, store, theme park, etc. For instance, the geolocation determination module 202 may determine a distance between the geolocation associated with a content item 130 and geolocations of known attractions at or near the travel destination. In some examples, the geolocation determination module 202 may determine that the known attraction that is closest (i.e., within a threshold distance) to the geolocation associated with the content item 130 is the attraction that corresponds to the geolocation. As a non-limiting example, the geolocation associated with a content item 130 may not directly correlate with a known attraction but may be within a threshold distance of a known attraction, such as the Woodland Park Zoo in Seattle, Wash. Accordingly, the geolocation determination module 202 may infer that the content item 130 was captured, published, etc. at the Woodland Park Zoo. Or, the geolocation determination module 202 may identify that the content item 130 depicts a tiger at a zoo while the consumer is visiting Seattle, Wash. Accordingly, the geolocation determination module 202 may infer that the content item 130 was captured, published, etc. at the Woodland Park Zoo. In some examples, the geolocation determination module 202 may not be able to determine the attraction associated with the content item. In such examples, the service provider 102 may prompt a consumer for additional information.

The time/date determination module 204 may determine times and/or dates (e.g., time data and/or data data) associated with content items 130. In at least one example, the time/date determination module 204 may utilize metadata associated with content items 130 to determine the time and/or date when a content item 130 was published, a time and/or date referred to in the content items 130, or time and/or date otherwise associated with the content items 130, etc. Time data may be utilized to determine a time of day that a consumer visits an attraction, an amount of time that a consumer spends at an attraction, an amount of time that a consumer spends travelling between attractions, etc. The date data may be utilized to determine a time of year associated with the content item (e.g., seasons, holidays, etc.).

In some examples, the time/date determination module 204 may prompt a consumer for time and/or date information. In other examples, the time/date determination module 204 may infer time and/or date associated with content items 130. For instance, the time/date determination module 204 may utilize data output by the content determination module 206 to infer times and/or dates associated with the content items 130. Or, the time/date determination module 204 may leverage information associated with consumers such as user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with mapping applications (e.g., maps requests, directions requests, etc.), user information and user actions associated with third party sources and systems (e.g., social networks, professional networks, partner webstore purchases, etc.), etc. to determine a date or time associated with the content items 130.

For instance, a consumer may have a reservation at the Seattle Aquarium for 2:00 pm. Sometime after the consumer leaves the Seattle Aquarium, the consumer may post to FACEBOOK® about his or her experience at the Seattle Aquarium. The time/date determination module 204 may leverage data indicating the 2 pm reservation to determine a time associated with the consumer's visit to the Seattle Aquarium.

The content determination module 206 may process the content items 130 to determine content (e.g., content data) associated with the content items 130. For instance, the content determination module 206 may determine what an image, video, etc. depicts (e.g., subjects depicted, objects depicted, activities depicted, geographical locations depicted, scenes depicted, events depicted, landmarks depicted, etc.). For instance, in at least one example, the content determination module 206 may extract features from images, videos, etc. (e.g., low-level features (e.g., edge detection, corner detection, blob detection, ridge detection, scale-invariant feature transform, etc.), shape based features (e.g., thresholding, blob extraction, template matching, hough transform, etc.), etc.) and may utilize image and/or video processing models (e.g., machine learning algorithms such as AdaBoost, boosting, conceptual clustering, decision-tree learning, k-nearest neighbors algorithm, multi-label classification, multiclass classification, nearest neighbor search, support vector machines, neural networks, edge matching, greyscale matching, gradient matching, etc.), feature-based methods (e.g., interpretation trees, pose consistency, pose clustering, scale-invariant feature transform (SIFT), speeded up robust features (SURF), etc.), bag of words modeling, etc.) to determine information about an image and/or video including, but not limited to, one or more subjects depicted in images and/or videos, objects depicted in images and/or videos, activities depicted in images and/or videos, geographical locations depicted in images and/or videos, scenes depicted in images and/or videos, events depicted in images and/or videos, landmarks depicted in images and/or videos, etc. In some examples, the one or more subjects depicted in images and/or videos, objects depicted in images and/or videos, activities depicted in images and/or videos, geographical locations depicted in images and/or videos, scenes depicted in images and/or videos, events depicted in images and/or videos, landmarks depicted in images and/or videos, etc. may be persistently associated with the images and/or videos as descriptive metadata.

Or, the content determination module 206 may determine the semantic meaning of text associated with social media posts, microblog posts, blog posts, etc. In such examples, the content determination module 206 may leverage various text data mining techniques to derive data from text associated with social media posts, microblog posts, blog posts, etc. For instance, the content determination module 206 may parse text associated with social media posts, microblog posts, blog posts, etc. and may leverage various natural language processing techniques based at least partly on text mining (e.g., text categorization, text clustering, concept/entity extraction, sentiment analysis, etc.) and/or text analysis (pattern recognition, tagging/annotation, information extraction, visualization, predictive analytics, etc.) to determine subjects referred to in text, activities referred to in the text, geographical locations referred to in the text, events referred to in the text, landmarks referred to in the text, etc. The subjects referred to in the text, activities referred to in the text, geographical locations referred to in the text, events referred to in the text, landmarks referred to in the text, etc. may be persistently associated with the content items 130 as descriptive metadata.

The information determination module 208 may determine additional information associated with attractions identified from the content items 130. In some examples, an attraction may be associated with another itinerary that is stored in the database 128 and, accordingly, at least some additional information associated with the attraction may be stored in the database 128. In other examples, the information determination module 208 may request additional and/or alternative information associated with the attractions identified in the content items 130 from third party sources and/or systems. In at least one example, the information determination module 208 may send a query including terms associated with an attraction. For instance, the information determination module 208 may include a geographic location determined by the geolocation determination module 202 and/or an activity, geographical location, event, landmark, etc. as determined by the content determination module 206 as terms in the query. Responsive to sending the query, the information determination module 208 may receive search results. For instance, the search results may be associated with content that is available via online sources associated with, for example, chambers of commerce associated with travel destinations, websites corresponding to attractions associated with travel destinations, reviews of attractions associated with travel websites, etc. In some examples, the search results may be leveraged by the generation module 118 to supplement information about the attractions and/or may be added to itineraries to assist consumers in planning their travel. For instance, responsive to a query associated with Seattle Mariners professional baseball team, the search results may return the Seattle Mariners' homepage, schedule, and/or ticket purchasing portal. In some examples, as described below, a link corresponding to the Seattle Mariners' homepage, schedule, and/or ticket purchasing portal may be added to a user interface generated for recommending an itinerary 132 to a consumer.

The generation module 118 may generate itineraries 132 based at least in part on the content items 130. The generation module 118 may include modules for generating the itineraries 132. For instance, the generation module 118 may include an attraction determination module 210, a route determination module 212, an itinerary determination module 214, a review module 216, an itinerary management module 218, etc.

The attraction determination module 210 may determine attractions visited by a consumer while visiting a destination. Initially, the attraction determination module 210 may determine that a consumer is visiting a particular destination. In some examples, a consumer may make reservations for accommodations in a particular destination, purchase an inbound and outbound plane ticket associated with the particular destination, book a rental car associated with the particular destination, reserve an activity with the particular destination, purchase a product (e.g., a guide book, etc.) associated with the particular destination, etc. The attraction determination module 210 may leverage such information to determine that a consumer is visiting a corresponding destination. That is, based at least in part on determining the particular destination associated with the reservation, plane ticket, car rental, etc., the attraction determination module 210 may determine that the consumer is visiting the particular destination. In additional and/or alternative examples, the attraction determination module 210 may access user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with third party sources and systems (e.g., social networks, professional networks, partner webstore purchases, etc.), etc. to determine that a consumer is visiting a particular destination. Additionally, the attraction determination module 210 may determine dates that the consumer is visiting the particular destination or a period of time that the consumer is visiting the particular destination (e.g., based on the dates of the reservations, dates of the inbound and outbound flights, etc.). Or, the attraction determination module 210 may determine a number of travelers traveling with the consumer.

The attraction determination module 210 may access the geographic location data, the time data, the date data, the content data, etc. to determine attractions visited by a consumer that are within a threshold distance of the destination and/or occurred within a period of time. The period of time may be a day, a week, a length of the trip to the destination (e.g., determined based on a length of a reservation at an accommodation, an amount of time between inbound and outbound flights, etc.). In at least some examples, the attraction determine module 210 may determine an attraction based at least in part on determining that the attraction is identified in a content item 130, is identified in a number of content items 130 above a predetermined threshold, etc. In some examples, the attraction determination module 210 may access data from additional and/or alternative sources to supplement the geographic location data, the time data, the date data, etc. for identifying attractions.

The route determination module 212 may determine routes associated with attractions corresponding to travel destinations. As described above, a route may refer to the order of travel between attractions and/or within or around an attraction. The route determination module 212 may access the geographic location data, the time data, the date data, the content data, etc. to determine at least an order that a consumer travels between attractions. For instance, the route determination module 212 may access the geographic location data, the time data, the date data, the content data, etc. and may arrange the content items 130 in a chronological order. Based at least in part on arranging the content items 130 into chronological order, the route determination module 212 may observe an order in which a consumer visits attractions, an amount of time the consumer spends at attractions, a route or path within or around one or more of the attractions, a route of travel the consumer uses to get to the attractions, a mode of transportation the consumer uses to get to the attractions, etc.

The itinerary determination module 214 may leverage the attractions determined by the attraction determination module 210 and the route identified by the route determination module 212 to generate at least a partial itinerary. The itinerary determination module 214 may generate the partial itinerary without any input from a corresponding consumer. The partial itinerary may include one or more attractions, a recommended time for visiting each of the one or more attractions, images and/or videos associated with the one or more attractions, etc. Additional details about the partial itinerary generated by the itinerary determination module 214 are described below in FIG. 7A.

The review module 216, via the presentation module 124, may cause a user interface configured to receive input and/or feedback about the partial itinerary from a consumer to be presented to the consumer. For instance, the user interface may include a partial itinerary that may include a recap of a consumer's travel during a time period. The time period may be one hour, six hours, one day, two days, one week, a time corresponding to the length of the trip, etc. The partial itinerary may include one or more attractions, a recommended time for visiting each of the one or more attractions, images and/or videos associated with the one or more attractions, etc., as described above.

In some examples, one or more details may be missing from a complete itinerary, thereby making the itinerary a partial itinerary. In such examples, the review module 216 and/or the presentation module 124 may generate a user interface configured to prompt the consumer to provide additional information to complete the partial itinerary and thereby generate a complete itinerary. In addition to prompting the consumer for information about his or her travel to generate a complete itinerary from a partial itinerary, the review module 216 may prompt the consumer for feedback (e.g., ratings, reviews, etc.). In at least one example, the review module 216 and/or the presentation module 124 may generate a user interface and/or supplement a user interface as described above to include one or more mechanisms for receiving feedback from users (e.g., ratings, reviews, etc.), as described in FIG. 7A below.

As a non-limiting example, the itinerary determination module 214 may determine that a consumer visited a first attraction in a first neighborhood at 10 am and visited a second attraction in a second neighborhood at 1 pm. The itinerary determination module 214 may not be able to determine how the consumer travelled between the first neighborhood and the second neighborhood or if the consumer visited any attractions between the first attraction and the second attraction (perhaps because the consumer did not take any images or videos and/or didn't post via social media, microblogs, blogs, etc.). Accordingly, the review module 216 may interact with the presentation module 124 to generate a user interface configured to prompt the consumer to indicate how he or she travelled from the first neighborhood to the second neighborhood or if the consumer stopped at any other attractions between the first attraction and the second attraction. Additionally and/or alternatively, the review module 216 may prompt the consumer for feedback (e.g., a rating, a review, etc.) associated with the first attraction or the second attraction.

In yet another non-limiting example, the itinerary determination module 216 may determine that a consumer rented bikes or kayaks to explore a portion of the travel destination. However, the itinerary determination module 214 may not be able to determine where the consumer rented the bikes or the kayaks. Accordingly, the review module 216 may interact with the presentation module 124 to generate a user interface configured to prompt the consumer to indicate where the consumer rented the bikes or the kayaks, the cost of the rental, the length of the rental, feedback associated with the rental (e.g., experience and/or the merchant), etc. and cause the user interface to be presented to the consumer to generate a complete itinerary.

The itinerary management module 218 may manage itineraries to ensure that itineraries 132 that are stored in the database 128, described below, are not duplicative, incomplete, inaccurate, etc. In some examples, the itinerary management module 218 may access and/or receive a recently completed itinerary and may compare the recently completed itinerary to itineraries 132 stored in the database 128. A machine learning algorithm may be used to determine a similarity score between the recently completed itinerary and individual itineraries 132 stored in the database 128. The machine learning algorithm may include a supervised learning algorithm (e.g., artificial neural networks, Bayesian statistics or networks, Gaussian process regression, logistic model trees, support vector machines, etc.), an unsupervised learning algorithm (e.g., artificial neural networks, association rule learning, hierarchical clustering, cluster analysis, etc.), a deep learning algorithm, etc. The machine learning algorithm may compare attractions included in the recently completed itinerary and individual itineraries 132 stored in the database 128, routes associated with the recently completed itinerary, a date and/or time of year associated with the recently completed itinerary, a length of travel associated with the recently completed itinerary, etc. and individual itineraries 132 stored in the database 128 and may output a similarity score for the recently completed itinerary.

In some examples, the itinerary management module 218 may determine that a recently completed itinerary is not duplicative based at least in part on determining that the similarity score is below a predetermined threshold (i.e., the similarity score indicates that the recently completed itinerary and individual itineraries 132 stored in the database 128 are not similar). Or, the itinerary management module 218 may determine that a recently completed itinerary is not duplicative based at least in part on determining that the similarity score is within a predetermined range of similarity scores (i.e., the similarity score indicates that the recently completed itinerary and individual itineraries 132 stored in the database 128 are not similar).

In other examples, the itinerary management module 218 may reject a recently completed itinerary based at least in part on determining that the similarity score is above a predetermined threshold (i.e., the similarity score indicates that the recently completed itinerary and individual itineraries 132 stored in the database 128 are too similar). Or, the itinerary management module 218 may reject a recently completed itinerary based at least in part on determining that the similarity score is outside of a predetermined range of similarity scores (i.e., the similarity score indicates that the recently completed itinerary and individual itineraries 132 stored in the database 128 are too similar).

In examples where the itinerary management module 218 rejects a recently completed itinerary for being too similar to individual itineraries 132 that are stored in the database 128, the itinerary management module 218 may determine whether the recently completed itinerary includes additional and/or alternative information that may be utilized to supplement the individual itineraries 132 that are stored in the database 128. For instance, the recently completed itinerary may include additional pictures, an additional review, and/or additional rating that may be used to supplement at least one itinerary 132 stored in the database 128. Or, the recently completed itinerary may include information that one of the attractions is temporarily closed, has relocated, etc. Moreover, in some examples, the itinerary management module 218 may extract the feedback data from a recently completed itinerary that it determined is too similar to individual itineraries 132 that are stored in the database 128 and may adjust ratings and/or reviews based at least in part on the ratings and/or reviews associated with the recently completed itinerary. For instance, a recently completed itinerary deemed to be duplicative may not be stored in the database 128 but may be utilized as feedback data to improve a rating of the itinerary 132 that is already stored in the database 128.

Additionally and/or alternatively, the itinerary management module 218 may review itineraries to ensure that the itineraries are not incomplete, inaccurate, etc. For instance, the itinerary management module 218 may review completed itineraries to ensure that the completed itineraries are not missing content or are so incomplete that a consumer may not find the itinerary useful. Or, the itinerary management module 218 may utilize information associated with recently completed itineraries to confirm the accuracy of itineraries 132 stored in the database 128. In some examples, the itinerary management module 218 may access feedback data from the feedback module 122 for determining whether itineraries are incomplete or inaccurate.

The recommendation module 120 may determine itineraries 132 to recommend to consumers. The recommendation module 120 may include modules for determining itineraries 132 to recommend to consumers. For instance, the recommendation module 120 may include a destination determination module 220, an itinerary determination module 222, etc.

The destination determination module 220 may determine an intended travel destination of a consumer. In some examples, a consumer may make reservations for accommodations in a particular destination, purchase an inbound and outbound plane ticket associated with the particular destination, book a rental car associated with the particular destination, reserve an activity with the particular destination, purchase a product (e.g., a guide book, etc.) associated with the particular destination, etc. Based at least in part on determining the particular destination associated with the reservation, plane ticket, car rental, etc., the destination determination module 220 may determine that the particular destination is the intended travel destination of a consumer. In additional and/or alternative examples, the destination determination module 220 may access user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with third party sources and systems (e.g., social networks, professional networks, partner webstore purchases, etc.), etc. to determine an intended travel destination of a consumer.

In at least one example, the destination determination module 220 may utilize machine learning algorithms to determine an intended travel destination of the consumer. The machine learning algorithms may include supervised learning algorithms (e.g., artificial neural networks, Bayesian statistics or networks, Gaussian process regression, logistic model trees, support vector machines, etc.), unsupervised learning algorithms (e.g., artificial neural networks, association rule learning, hierarchical clustering, cluster analysis, etc.), deep learning algorithms, etc. The machine learning algorithms may access and/or receive user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with third party sources and systems (e.g., social networks, professional networks, partner webstore purchases, etc.), etc. and may output potential travel destinations determined based at least in part on the user information and/or user actions.

For instance, in at least one example, a consumer may purchase a suitcase and snorkeling gear, search "Maui hotels," browse the Grand Wailea Resort, the Four Seasons Resort Maui, and the Westin Maui Resort and Spa, etc. Based at least in part on the user information and user actions, the destination determination module 220 may leverage the machine learning algorithms to determine that the intended destination of the consumer is Maui, Hi. In some examples, the consumer may publish a content item 130 and the destination determination module 220 may access the content of the content item 130 to determine the intended destination. For instance, a consumer may TWEET® "Maui vacation booked. @grandwailea, here we come. #excited #woot." The destination determination module 220 may determine that the consumer is travelling to Maui and staying at the Grand Wailea Resort. That is, Maui and/or the Grand Wailea Resort may be determined to be the intended destination.

In addition to determining the intended destination, the destination determination module 220 may determine a date associated with the travel, a length of a stay associated with the travel, a season associated with the travel, a number of individuals travelling, etc. In some examples, the destination determination module 220 may determine such information from a reservation for accommodations, plane tickets, car rentals, etc. For instance, the destination determination module 220 may determine that a consumer reserves a hotel room for a particular number of people for a particular number of nights on a particular date or purchases inbound and outbound plane tickets for a particular number of people on particular dates. Leveraging this information, the destination determination module 22 may determine a date associated with the travel, a length of a stay associated with the travel, a season associated with the travel, a number of individuals travelling, etc.

In additional and/or alternative examples, the destination determination module 220 may determine such information from user information and/or user actions associated with a user profile 134. For instance, the destination determination module 220 may determine that a consumer generally makes reservations for two people at dinner, purchases tickets for two people for various activities, posts images of him/herself and another person via social networking accounts, etc. Accordingly, the destination determination module 222 may determine that the consumer is likely travelling with one other person. Or, the destination determination module 220 may determine that a consumer generally makes reservations for three people at dinner, purchases baby supplies, posts images of a family of three including a toddler via social networking accounts, etc. Accordingly, the destination determination module 222 may determine that the consumer is likely travelling with his or her family of three, including one small child. The destination determination module 222 may leverage user information and/or user actions to determine seasons or dates that the consumer prefers to travel, lengths of time the consumer prefers to travel, etc. The number of individuals travelling, the length of travel, the time of year (e.g., seasons, etc.) may significantly impact itineraries that the recommendation module 120 determines to recommend to the consumer.

The itinerary determination module 222 may determine one or more itineraries 132 to recommend to a consumer. The itinerary determination module 222 may access data associated with an intended destination of the consumer as determined by the destination determination module 220 and may access candidate itineraries corresponding to the intended destination. The candidate itineraries may be a subset of the itineraries 132 that are stored in the database 128. The subset of the plurality of itineraries 132 accessed by the itinerary determination module 222 may correspond to at least a same level of granularity as the level of granularity known. For instance, if the destination determination module 220 determined a hotel, lodge, bed and breakfast, etc. as the intended destination, candidate itineraries corresponding to the hotel, lodge, bed and breakfast, etc. may be accessed. Or, if the destination determination module 220 determined a state as the intended destination, candidate itineraries corresponding to the state may be accessed.

In some examples, the itinerary determination module 222 may remove at least some candidate itineraries based at least in part on determining a suitability score corresponding to each of the candidate itineraries. A suitability score may represent a likelihood that a particular itinerary is to be of interest to a consumer. Suitability scores may be based at least in part on the intended destination, the date associated with the travel, the season associated with the travel, the duration of the travel, the number of people travelling together, the consumer's interests and/or preferences, etc. In at least one example, the itinerary determination module 222 may access data associated with a user profile 134 corresponding to the consumer and leverage the data for determining the one or more itineraries that are most likely to be of interest to recommend to the consumer. For instance, the itinerary determination module 222 may access and/or receive user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with third party sources and systems (e.g., social networks, professional networks, partner webstore purchases, etc.), etc. that may be mapped to the user profile 134 corresponding to the consumer in the database 128. That is, the itinerary determination module 222 may determine trends and/or preferences associated with the consumer for gaining insight with respect to which itineraries are most likely to be of interest to the consumer. For instance, the itinerary determination module 222 may leverage the user information and user actions to determine trends and/or preferences such as, how many individuals are travelling, ages of the travelers, subscriptions and/or memberships associated with the consumer, vacationing style (e.g., relaxation or on-the-go, outdoor activities or inside activities, luxurious or budget, etc.), etc. The user information and user actions may enable the itinerary determination module 222 to determine an itinerary that is most likely to be of interest to a particular traveler.

The itinerary determination module 222 may utilize machine learning algorithms to determine the suitability scores corresponding to individual candidate itineraries. The machine learning algorithms may include supervised learning algorithms (e.g., artificial neural networks, Bayesian statistics or networks, Gaussian process regression, logistic model trees, support vector machines, etc.), unsupervised learning algorithms (e.g., artificial neural networks, association rule learning, hierarchical clustering, cluster analysis, etc.), deep learning algorithms, etc. The machine learning algorithms may determine a suitability score for each candidate itinerary based at least in part on accessing data associated with the intended destination, the date associated with the travel, the season associated with the travel, the duration of the travel, the number of people travelling together, the consumer's interests and/or preferences, etc. The machine learning algorithms may access and/or receive user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with third party sources and systems (e.g., social networks, professional networks, partner webstore purchases, etc.), etc. and data associated with the intended travel destination may evaluate individual candidate itineraries in view of the user information and user actions. For instance, the itinerary determination module 222 may access individual candidate itineraries from the database 128 and may compare the one or more attractions and/or routes in the candidate itineraries with the interests and/or preferences of the consumer (as determined by the user information and user actions). In additional and/or alternative examples, the itinerary determination module 222 may leverage the date associated with the travel, the season associated with the travel, the duration of the travel, the number of people travelling together, etc. to determine the suitability score.

The itinerary determination module 222 may remove at least some of the candidate itineraries based at least in part on determined suitability scores. A suitability score above a predetermined threshold or within a predetermined range of suitability scores may indicate that the corresponding candidate itinerary is likely to be of interest to the consumer. Accordingly, the itinerary determination module 222 may determine the candidate itinerary may be an itinerary to recommend to the consumer. A suitability score below a predetermined threshold or outside of the range of suitability scores may indicate that the corresponding candidate itinerary is not likely to be of interest to the consumer. The itinerary determination module 222 may remove candidate itineraries that are not likely to be of interest to the consumer from candidate itineraries. In at least some examples, the itinerary determination module 222 may determine a number of candidate itineraries that are likely to be of interest to a consumer based at least in part on each candidate itinerary of the number of candidate itineraries each having a suitability score above a threshold value. Or, the itinerary determination module 222 may determine a number of candidate itineraries that are likely to be of interest to a consumer based at least in part on the number of candidate itineraries having highest suitability scores. In at least some examples, if more than one candidate itinerary is determined to be likely to be of interest to a consumer, the itinerary determination module 222 may rank individual candidate itineraries based at least in part on suitability scores and/or ratings associated with the candidate itineraries. In such examples, the recommendation module 120 may recommend at least the top raking candidate itinerary to the consumer and, in some examples, may recommend two or more of the top raking candidate itineraries to the consumer.

In a non-limiting example, the user information and user actions associated with a user profile 134 may indicate that a consumer purchased snorkeling gear and a trail guide for hiking trails in Hawaii. Furthermore, the itinerary determination module 222 may determine that a consumer is travelling for 6 days in January (e.g., winter). Accordingly, the itinerary determination module 222 may determine that a consumer is interested in snorkeling and/or hiking and may assign a suitability score above the threshold value or within the range of suitability scores to one or more itineraries including attractions associated with snorkeling and/or hiking that have a same and/or similar duration of travel and/or season associated with the travel. Conversely, the itinerary determination module 222 may assign an itinerary that includes shopping a suitability score below a threshold value or outside of the range of suitability scores indicating that an itinerary is not likely to be of interest to a consumer. Or, the user information and user actions associated with a user profile 134 may indicate that a consumer searched for "floatplane tours in Seattle" and browsed different hotels in the San Juan Islands for four nights in June (e.g., spring/summer). Accordingly, the itinerary determination module 222 may determine that a consumer is interested in visiting the San Juan Islands via a floatplane and may assign a suitability score above the threshold value or within the range of suitability scores to one or more itineraries including attractions associated with the San Juan Islands and/or floatplane tours in Seattle. Additional and/or alternative technologies may be used to determining which itineraries of the itineraries 132 stored in the database 128 to recommend to particular consumers.

Based at least in part on determining an itinerary 132 to recommend to the consumer, the itinerary determination module 222 and/or the presentation module 124 may generate a user interface configured to present the itinerary 132 to the consumer, as described in FIG. 7B. The presentation module 124 may cause the user interface to be presented to the consumer via a device 108 corresponding to the consumer.

In additional and/or alternative examples, the recommendation module 120 may recommend one or more products and/or services offered by the service provider 102 and/or on behalf of merchants by the service provider 102. In at least one example, the recommendation module 120 may access and/or receive user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with third party sources and systems (e.g., social networks, professional networks, partner webstore purchases, etc.), etc. and the recommended itinerary and may identify products and/or services to recommend to the consumer.

FIGS. 3-6 describe example processes for accessing content items 130 created by users to determine itineraries for particular travel destinations. The example processes are described in the context of the environments of FIGS. 1 and 2 but are not limited to those environments. The processes are illustrated as logical flow graphs, each operation of which represents a sequence of operations that may be implemented in hardware, software, or a combination thereof. In the context of software, the operations represent computer-executable instructions stored on one or more computer-readable media 114 that, when executed by one or more processors 112, perform the recited operations. Generally, computer-executable instructions include routines, programs, objects, components, data structures, and the like that perform particular functions or implement particular abstract data types.

The computer-readable media 114 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments the computer-readable media 114 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

Figure 3:
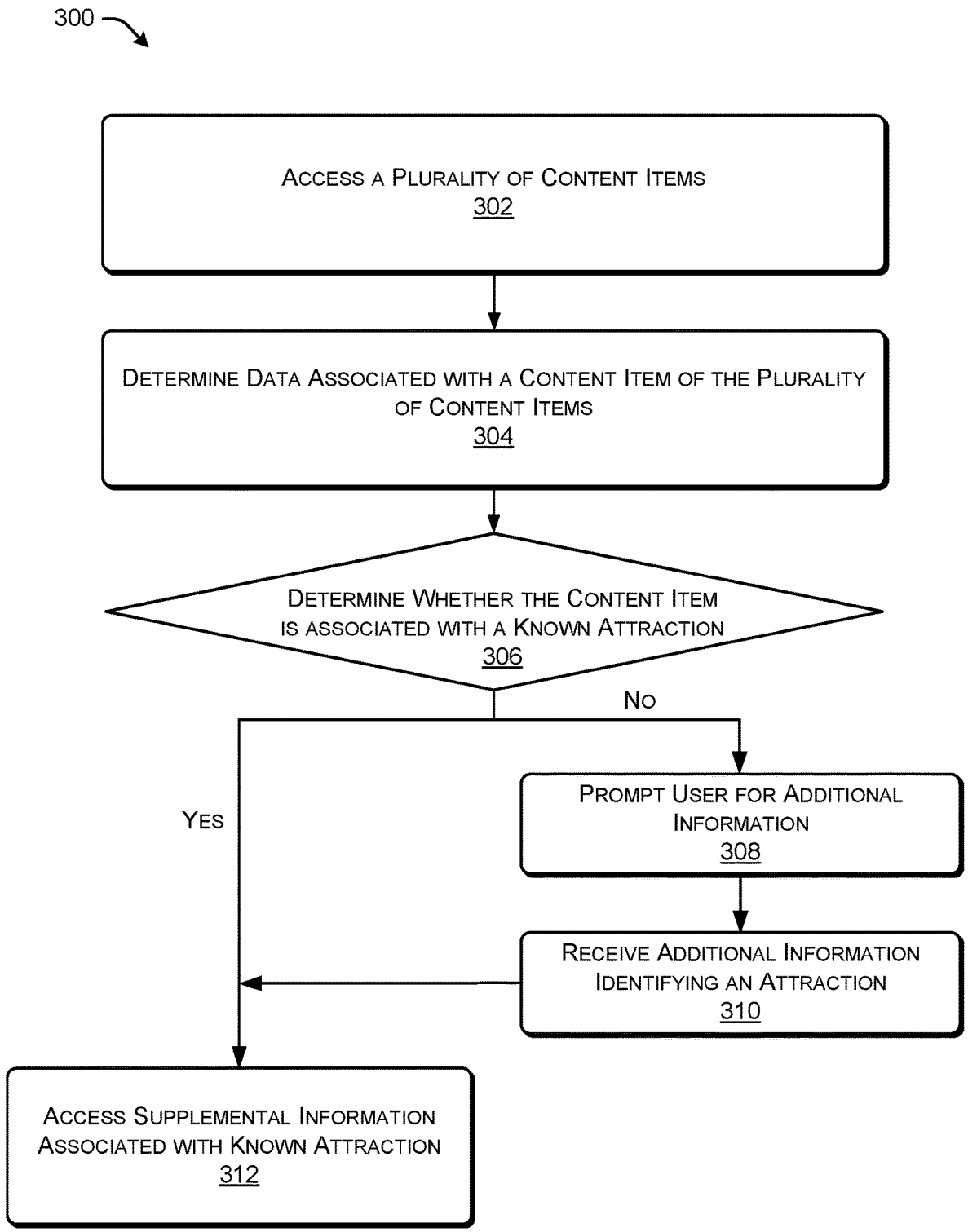
FIG. 3 is a flow diagram showing an illustrative process to access content items and determine information associated with the content items for generating itineraries.

FIG. 3 is a flow diagram showing an illustrative process 300 to access content items 130 and determine information associated with the content items 130 for generating itineraries 132.

Block 302 illustrates accessing a plurality of content items 130. The content module 116 may access and/or receive content items 130. As described above, content items 130 include images, videos, social media posts (e.g., FACEBOOK® status update, INSTAGRAM® photo, SNAPCHAT® story, etc.), microblog posts (e.g., TWITTER® TWEET®, TUMBLR®, etc.), blog posts (e.g., BLOGGER®, WORDPRESS®, etc.), etc. The content module 116 may include modules for processing the content items 130 and/or accessing, receiving, and/or determining additional information associated with content items 130. For instance, the content module 116 may include a geolocation determination module 202, a time/date determination module 204, a content determination module 206, an information determination module 208, etc., as described above.

Block 304 illustrates determining data associated with a content item 130 of the plurality of content items 130. As described above, the content items 130 may be associated with metadata. Metadata may include technical metadata, descriptive metadata, administrative metadata, etc. In at least some examples, the geolocation determination module 202, the time/date determination module 204, and/or the content determination module 206 may access data (e.g., metadata) associated with the content items 130 and may process the data, as described herein.

For instance, the geolocation determination module 202 may determine geographic locations (e.g., geolocation data) associated with content items 130. In at least one example, the geolocation determination module 202 may leverage explicit information to determine geographic locations. For instance, the geolocation determination module 202 may utilize metadata associated with content items 130 to determine a geographic location associated with where a content item 130 was published, a geographic location referred to in the content items 130, or a geographic location otherwise associated with the content items 130, etc.

As described above, the time/date determination module 204 may determine times and/or dates (e.g., time data and/or data data) associated with content items 130. In at least one example, the time/date determination module 204 may utilize metadata associated with content items 130 to determine the time and/or date when a content item 130 was published, a time and/or date referred to in the content items 130, or time and/or date otherwise associated with the content items 130, etc. In some examples, the time/date determination module 204 may prompt a consumer for time and/or date information. In other examples, the time/date determination module 204 may infer time and/or date associated with content items 130, as described above.

The content determination module 206 may process the content items 130 to determine content (e.g., content data) associated with the content items 130. For instance, the content determination module 206 may determine what an image, video, etc. depicts (e.g., subjects depicted, objects depicted, activities depicted, geographical locations depicted, scenes depicted, events depicted, landmarks depicted, etc.). Or, the content determination module 206 may determine the semantic meaning of text associated with a social media post, microblog post, blog post, etc., as described above.

Block 306 illustrates determining whether the content item 130 is associated with a known attraction. As described above, the geolocation determination module 202 may leverage the geolocation data and/or the content data output by the content determination module 206 to determine whether a content item 130 is associated with a known attraction such as a state park, national park, landmark, restaurant, store, theme park, etc. For instance, the geolocation determination module 202 may determine a distance between the geolocation associated with a content item 130 and geolocations of known attractions at or near the travel destination, as described above, for determining whether a content item 130 is associated with a known attraction.

Based at least in part on determining that the content item 130 is not associated with a known attraction (or, that the geolocation determination module 202 cannot identify a known attraction corresponding to the content item 130), the geolocation determination module 202 may prompt a user 106 (e.g., consumer) for additional information, as illustrated in block 308. The user 106 may provide additional information identifying the attraction associated with the content item 130, as illustrated in block 310. Based at least in part on the user 106 (e.g., consumer) providing additional information identifying the attraction associated with the content item 130, the attraction may be determined to be a known attraction. Based at least in part on determining that the individual content items is associated with a known attraction, the information determination module 208 may access supplemental information associated with the known attraction, as illustrated in block 312.

As described above, the information determination module 208 may determine additional information associated with attractions identified from the content items 130. In some examples, an attraction may be associated with another itinerary that is stored in the database 128 and, accordingly, at least some additional information associated with the attraction may be stored in the database 128. In other examples, the information determination module 208 may request additional and/or alternative information associated with the attractions identified in the content items 130 from third party sources and/or systems. In at least one example, the information determination module 208 may send a query including terms associated with an attraction, as described above. Responsive to sending the query, the information determination module 208 may receive search results. In some examples, the search results may be leveraged by the generation module 118 to supplement information about the attractions and/or may be added to itineraries to assist consumers in planning their travel.

Figure 4:
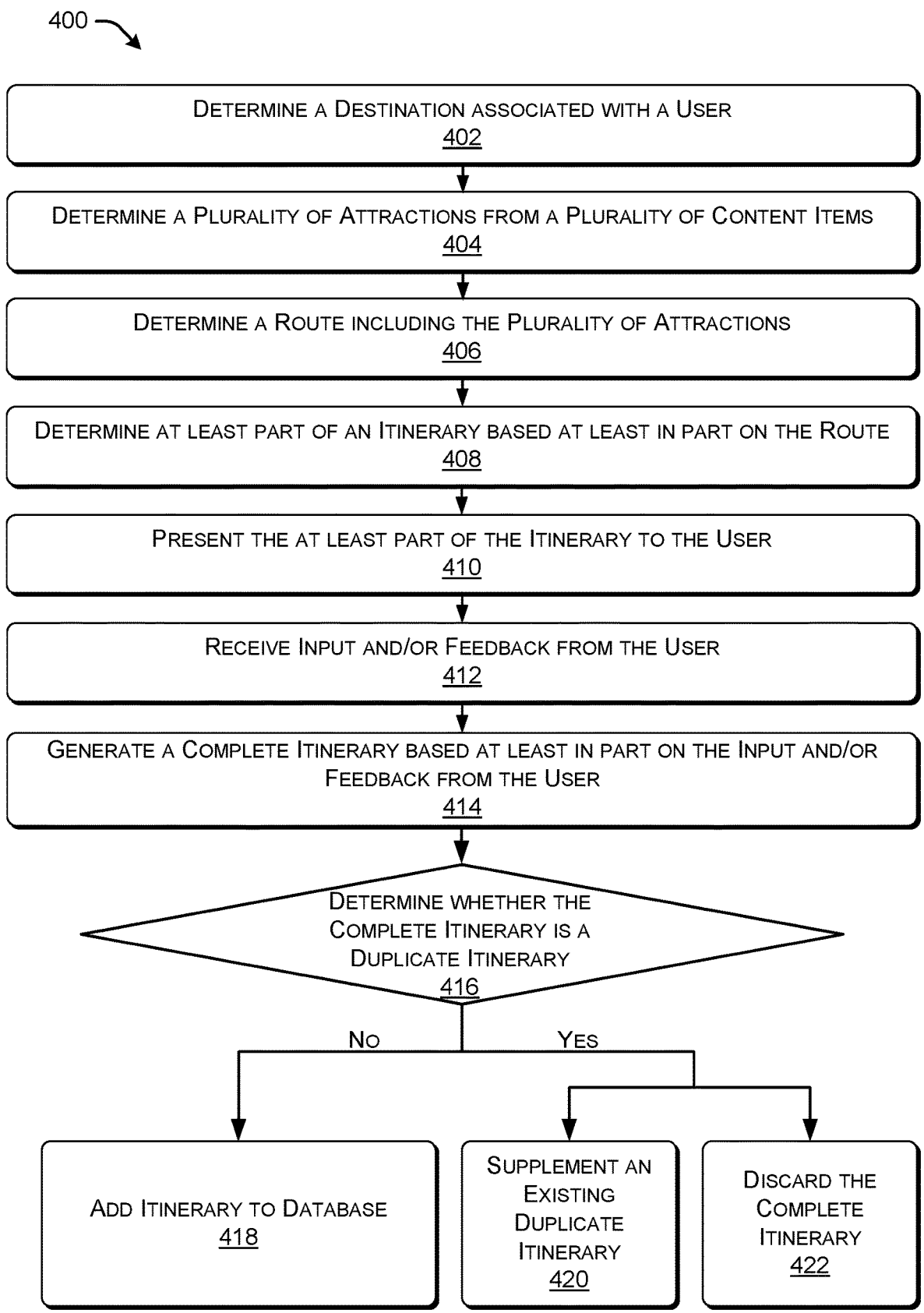
FIG. 4 is a flow diagram showing an illustrative process to generate itineraries based at least in part on a plurality of content items.

FIG. 4 is a flow diagram showing an illustrative process 400 to generate itineraries 132 based at least in part on a plurality of content items.

Block 402 illustrates determining a destination associated with a user. As described above, the attraction determination module 210 may determine that a consumer is visiting a particular destination. In some examples, a consumer may make reservations for accommodations in a particular destination, purchase an inbound and outbound plane ticket associated with the particular destination, book a rental car associated with the particular destination, reserve an activity with the particular destination, purchase a product (e.g., a guide book, etc.) associated with the particular destination, etc. Based at least in part on determining the particular destination associated with the reservation, plane ticket, car rental, etc., the attraction determination module 210 may determine that the consumer is visiting the particular destination. In additional and/or alternative examples, the attraction determination module 210 may access user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with third party sources and systems (e.g., social networks, professional networks, partner web-store purchases, etc.), etc. to determine that a consumer is visiting a particular destination. Additionally, the attraction determination module 210 may determine dates that the consumer is visiting the particular destination or a period of time that the consumer is visiting the particular destination (e.g., based on the dates of the reservations, dates of the inbound and outbound flights, etc.). Or, the attraction determination module 210 may determine a number of travelers traveling with the consumer.

Block 404 illustrates determining a plurality of attractions from a plurality of content items 130. As described above, the attraction determination module 210 may determine attractions visited by a consumer while visiting a destination. The attraction determination module 210 may access the geographic location data, the time data, the date data, the content data, etc. to determine attractions visited within a threshold distance of the destination and/or within a period of time, as described above. In at least some examples, the attraction determine module 210 may determine an attraction based at least in part on determining that the attraction is identified in a content item 130, is identified in a number of content items 130 above a predetermined threshold, etc. In some examples, the attraction determination module 210 may access data from additional and/or alternative sources to supplement the geographic location data, the time data, the date data, etc. for identifying attractions.

Block 406 illustrates determining a route including the plurality of attractions. As described above, the route determination module 212 may determine routes associated with attractions corresponding to travel destinations. As described above, a route may refer to the order of travel between attractions. The route determination module 212 may access the geographic location data, the time data, the date data, the content data, etc. to determine an order a consumer travels between attractions. For instance, the route determination module 212 may access the geographic location data, the time data, the date data, the content data, etc. and may arrange the content items 130 in a chronological order. Based at least in part on arranging the content items 130 into chronological order, the route determination module 212 may observe an order in which a consumer visits attractions, an amount of time the consumer spends at attractions, a route of travel the consumer uses to get to the attractions, a mode of transportation the consumer uses to get to the attractions, etc.

Block 408 illustrates determining at least a part of an itinerary based at least in part on the route. The itinerary determination module 214 may leverage the attractions determined by the attraction determination module 210 and the route identified by the route determination module 212 to generate at least a partial itinerary. In some examples, the itinerary may be a complete itinerary. In other examples, the itinerary may be missing at least some information and may therefore be a partial itinerary. The partial itinerary may include one or more attractions, a recommended time for visiting each of the one or more attractions, images and/or videos associated with the one or more attractions, etc.

Block 410 illustrates presenting the at least part of the itinerary to a user 106 (e.g., consumer). In some examples, one or more details may be missing from a complete itinerary, thereby making the itinerary a partial itinerary. In such examples, the review module 216 and/or the presentation module 124 may generate a user interface configured to prompt the consumer to provide additional information to complete the partial itinerary and thereby generate a complete itinerary. In addition to prompting the consumer for information about his or her travel to generate a complete itinerary from a partial itinerary, the review module 216 may prompt the consumer for feedback (e.g., ratings, reviews, etc.). In at least one example, the review module 216 and/or the presentation module 124 may generate a user interface and/or supplement a user interface as described above to include one or more mechanisms for receiving feedback from users (e.g., ratings, reviews, etc.), as described in FIG. 7A below.

Block 412 illustrates receiving input and/or feedback from the user 106 (e.g., consumer). The consumer may provide input via user interfaces presented via corresponding devices 108 that are configured to receive input and/or feedback from the consumer.

Block 414 illustrates generating a complete itinerary based at least in part on the input and/or feedback from the user 106 (e.g., consumer). Based at least in part on receiving the user input and/or feedback, the generation module 118 may generate a complete itinerary.

Block 416 illustrates determining whether the complete itinerary is a duplicate itinerary. The itinerary management module 218 may manage itineraries to ensure that itineraries 132 that are stored in the database 128, described below, are not duplicative, incomplete, inaccurate, etc. The itinerary management module 218 may access and/or receive a recently completed itinerary and may compare the recently completed itinerary to itineraries 132 stored in the database 128. A machine learning algorithm may be used to determine a similarity score between the recently completed itinerary and the itineraries 132 stored in the database 128. The machine learning algorithm may compare attractions included in the recently completed itinerary, routes associated with the recently completed itinerary, a date and/or time of year associated with the recently completed itinerary, a length of travel associated with the recently completed itinerary, etc. and attractions included in the individual itineraries 132, routes associated with the individual itineraries 132, a date and/or time of year associated with the individual itineraries 132, a length of travel associated with the individual itineraries 132, etc. and may output a similarity score for the recently completed itinerary.

In some examples, the itinerary management module 218 may determine that a recently completed itinerary is not duplicative based at least in part on determining that the similarity score is below a predetermined threshold (i.e., the similarity score indicates that the recently completed itinerary and individual itineraries 132 stored in the database 128 are not similar). Or, the itinerary management module 218 may determine that a recently completed itinerary is not duplicative based at least in part on determining that the similarity score is within a predetermined range of similarity scores (i.e., the similarity score indicates that the recently completed itinerary and individual itineraries 132 stored in the database 128 are not similar). Based at least in part on determining that the complete itinerary is not duplicative of an itinerary stored in the database 128, the itinerary may be added to the database 128, as illustrated in block 418.

In other examples, the itinerary management module 218 may reject a recently completed itinerary based at least in part on determining that the similarity score is above a predetermined threshold (i.e., the similarity score indicates that the recently completed itinerary and individual itineraries 132 stored in the database 128 are too similar). Or, the itinerary management module 218 may reject a recently completed itinerary based at least in part on determining that the similarity score is outside of a predetermined range of similarity scores (i.e., the similarity score indicates that the recently completed itinerary and individual itineraries 132 stored in the database 128 are too similar). Based at least in part on determining that the complete itinerary is duplicative of an itinerary stored in the database 128, the itinerary management module 218 may determine whether to extract data from the duplicative itinerary to supplement an existing itinerary, as illustrated in block 420, or to discard the complete itinerary, as illustrated in block 422.

In examples where the itinerary management module 218 rejects a recently completed itinerary for being too similar to individual itineraries 132 that are stored in the database 128, the itinerary management module 218 may determine whether the recently completed itinerary includes additional and/or alternative information that may be utilized to supplement the individual itineraries 132 that are stored in the database 128. For instance, the recently completed itinerary may include additional pictures, an additional review, and/or additional rating that may be used to supplement at least one itinerary 132 stored in the database 128. Or, the recently completed itinerary may include information that one of the attractions is temporarily closed, has relocated, etc. Moreover, in some examples, the itinerary management module 218 may extract the feedback data from a recently completed itinerary that it determined is too similar to individual itineraries 132 that are stored in the database 128 and may adjust ratings and/or reviews based at least in part on the ratings and/or reviews associated with the recently completed itinerary.

Figure 5:
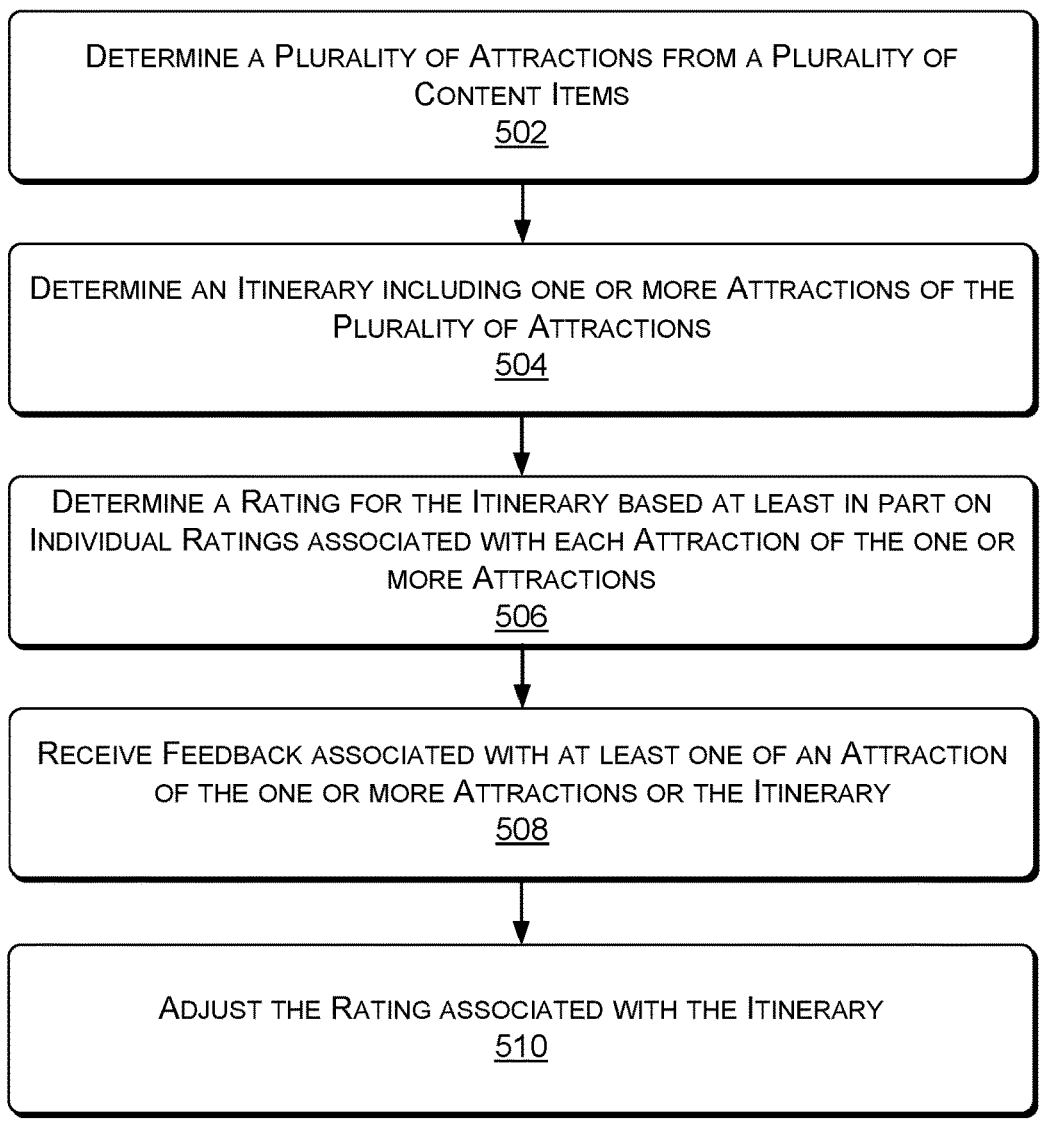
FIG. 5 is a flow diagram showing an illustrative process to process feedback and adjust ratings associated with itineraries generated based at least in part on a plurality of content items.

FIG. 5 is a flow diagram showing an illustrative process 500 to process feedback and adjust ratings associated with itineraries 132 generated based at least in part on a plurality of content items 130.

Block 502 illustrates determining a plurality of attractions from a plurality of content items 130. As described above, the attraction determination module 210 may determine attractions visited by a consumer while visiting a destination. The attraction determination module 210 may access the geographic location data, the time data, the date data, the content data, etc. to determine attractions visited within a threshold distance of the destination and/or within a period of time. In at least some examples, the attraction determine module 210 may determine an attraction based at least in part on determining that the attraction is identified in a content item 130, is identified in a number of content items 130 above a predetermined threshold, etc. In some examples, the attraction determination module 210 may access data from additional and/or alternative sources to supplement the geographic location data, the time data, the date data, etc. for identifying attractions.

Block 504 illustrates determining an itinerary 132 including one or more attractions of the plurality of attractions. The itinerary determination module 214 may leverage the attractions determined by the attraction determination module 210 and a route identified by the route determination module 212 to generate at least a partial itinerary. The itinerary determination module 214 may generate the partial itinerary without any input from a corresponding consumer. As described above, in some examples, one or more details may be missing in the partial itinerary. Accordingly, the review module 216 and/or the presentation module 124 may generate a user interface configured to prompt the consumer to provide input to fill in missing details. The user 106 may provide input via user interfaces presented via corresponding devices 108. Based at least in part on receiving the user input and/or feedback, the generation module 118 may generate a complete itinerary.

Block 506 illustrates determining a rating for the itinerary 132 based at least in part on individual ratings associated with each attraction of the one or more attractions. The generation module 118 may leverage feedback received from the user 106 to determine a rating associated with the itinerary. In some examples, the rating may be based on an average of the ratings of each attraction of the plurality of attractions in an itinerary, a median of the ratings of each attraction of the plurality of attractions in an itinerary, a sum of the ratings of each attraction of the plurality of attractions in an itinerary, etc. In other examples, the rating may be based on ratings of the itinerary. Additional and/or alternative factors may be considered in determining the rating.

Block 508 illustrates receiving feedback associated with at least one of an attraction of the one or more attractions or the itinerary. As described above, the feedback module 122 may access, receive, and/or determine feedback associated with attractions and/or itineraries 132. The feedback module 122 may receive feedback data from consumers (e.g., user 106). Consumers may provide feedback via a self-service website, application, or browser on a device 108, customer service, etc. Consumers may provide feedback relevant to previously recommended and/or acquired items, preferences, interests, likes/dislikes, complaints, etc. For instance, feedback data may include a type of feedback (e.g., positive, neutral, negative) and may include feedback provided directly from consumers, user ratings relating to items, attractions, itineraries, and/or merchants, user reviews of items, attractions, itineraries, and/or merchants, user responses to surveys and/or questionnaires, customer service feedback, information from sites (i.e., websites), and so on. In some examples, the feedback data may be express feedback data, for instance, from user ratings relating to individual attractions, user responses to surveys and/or questionnaires, customer service feedback, information from sites (i.e., websites), and so on. In other examples, the feedback data may be implied.

Block 510 illustrates adjusting the rating associated with the itinerary 132. Based at least in part on receiving feedback data, the generation module 118 may adjust the rating associated with the itinerary 132. For instance, based at least in part on receiving positive feedback associated with the itinerary 132, the generation module 118 may improve the rating associated with the itinerary 132. As described above, the itinerary management module 218 may determine that a recently completed itinerary is duplicative of an itinerary 132 stored in the database 128. The itinerary management module 218 may determine not to include the recently completed itinerary in the database 128, but the generation module 118 may improve the rating associated with the itinerary 132 that is already stored in the database 128. In contrast, based at least in part on receiving negative feedback associated with the itinerary 132, the generation module 118 may lower the rating associated with the itinerary 132.

Figure 6:
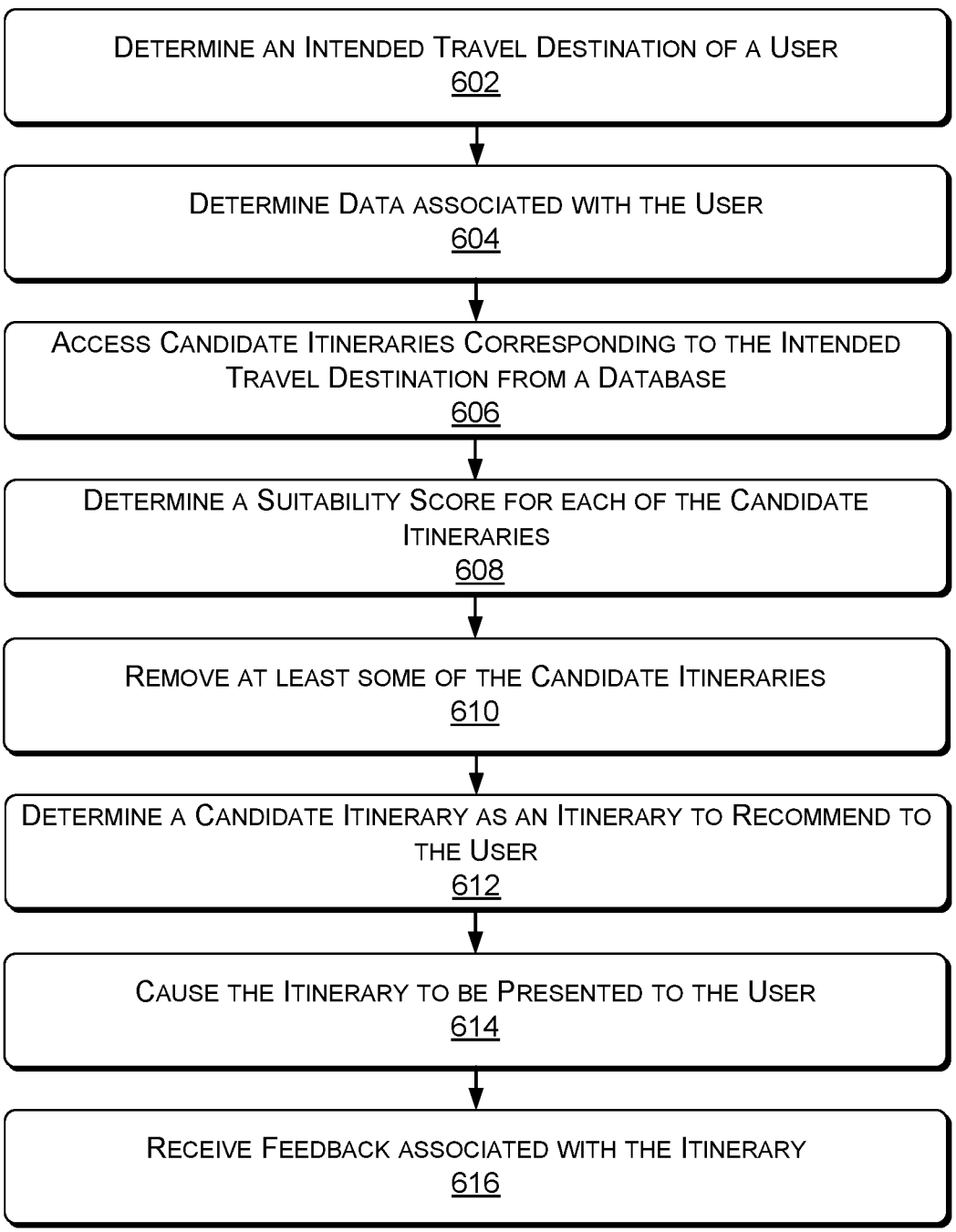
FIG. 6 is a flow diagram showing an illustrative process to determine an itinerary to recommend to a user.

FIG. 6 is a flow diagram showing an illustrative process 600 to determine an itinerary 132 to recommend to a user 106 (e.g., consumer).

Block 602 illustrates determining an intended travel destination of a user 106 (e.g., consumer). As described above, the destination determination module 220 may determine an intended travel destination of a consumer. In some examples, a consumer may make reservations for accommodations in a particular destination, purchase an inbound and outbound plane ticket associated with the particular destination, book a rental car associated with the particular destination, reserve an activity with the particular destination, purchase a product (e.g., a guide book, etc.) associated with the particular destination, etc. Based at least in part on determining the particular destination associated with the reservation, plane ticket, car rental, etc., the destination determination module 220 may determine that the particular destination is the intended travel destination of a consumer. In additional and/or alternative examples, the destination determination module 220 may access user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with third party sources and systems (e.g., social networks, professional networks, partner webstore purchases, etc.), etc. to determine an intended travel destination of a consumer. In at least one example, the destination determination module 220 may utilize machine learning algorithms to determine an intended travel destination of the consumer, as described above.

In addition to determining the intended destination, the destination determination module 220 may determine a date associated with the travel, a length of a stay associated with the travel, a season associated with the travel, a number of individuals travelling, etc. In some examples, the destination determination module 220 may determine such information from a reservation for accommodations, plane tickets, etc. In additional and/or alternative examples, the destination determination module 220 may determine such information from user information and/or user actions associated with a user profile 134, as described above.

Block 604 illustrates determining data associated with the user 106 (e.g., consumer). The itinerary determination module 222 may access and/or receive user information and user actions associated with a retail purchase account associated with a consumer (e.g., purchases, sales, reservations, items on a saved-items list (i.e., a wish-list), exchanges, returns, browsing history, search history, recommendations, personal demographic information, location proximity, calendar information, etc.), user information and user actions associated with third party sources and systems (e.g., social networks, professional networks, partner webstore purchases, etc.), etc. that may be mapped to the user profile 134 corresponding to the consumer in the database 128, as described above.

Block 606 illustrates accessing candidate itineraries corresponding to the intended travel destination from the database 128. As described above, the database 128 may include one or more itineraries 132. In at least one example, the database 128 may include a plurality of itineraries 132 that may be organized by destination. In some examples, individual itineraries 132 of the one or more itineraries 132 may be mapped to destinations with various levels of granularity. For instance, a first level of granularity may be the most inclusive and subsequent levels of granularity may be increasingly exclusive. That is, a first level of granularity may include a plurality of itineraries associated with a destination having the first level of granularity and subsequent levels of granularity may have fewer itineraries based at least in part on the subsequent levels of granularity being less broad (i.e., more specific) than the first level of granularity. The itinerary determination module 222 may access a plurality of itineraries 132 that are mapped to the intended travel destination, the plurality of itineraries 132 may be candidate itineraries.

Block 608 illustrates determining a suitability score for each of the candidate itineraries. The itinerary determination module 222 may determine suitability scores each corresponding to a candidate itinerary of the candidate itineraries. The itinerary determination module 222 may utilize machine learning algorithms to determine the suitability scores corresponding to individual candidate itineraries. Suitability scores may be based at least in part on the intended destination, the date associated with the travel, the season associated with the travel, the duration of the travel, the number of people travelling together, the consumer's interests and/or preferences, etc., as described above. A suitability score above a predetermined threshold or within a predetermined range of suitability scores may indicate that the corresponding candidate itinerary is likely to be of interest to the consumer. A suitability score below a predetermined threshold or outside of the range of suitability scores may indicate that the corresponding candidate itinerary is not likely to be of interest to the consumer.

Block 610 illustrates removing at least some of the candidate itineraries. In some examples, the itinerary determination module 222 may remove at least some candidate itineraries of the candidate itineraries based at least in part on determining a suitability score corresponding to each of the candidate itineraries. A suitability score below a predetermined threshold or outside of the range of suitability scores may indicate that the corresponding candidate itinerary is not likely to be of interest to the consumer. The itinerary determination module 222 may remove candidate itineraries that are not likely to be of interest to the consumer from candidate itineraries.

Block 612 illustrates determining a candidate itinerary as an itinerary to recommend to the user 106 (e.g., consumer). The itinerary determination module 222 may determine a candidate itinerary as an itinerary to recommend to the consumer. A suitability score above a predetermined threshold or within a predetermined range of suitability scores may indicate that the corresponding candidate itinerary is likely to be of interest to the consumer. Accordingly, the itinerary determination module 222 may determine the candidate itinerary is an itinerary to recommend to the consumer. In at least some examples, the itinerary determination module 222 may determine a number of candidate itineraries that are likely to be of interest to a consumer based at least in part on each candidate itinerary of the number of candidate itineraries each having a suitability score above a threshold value. Or, the itinerary determination module 222 may determine a number of candidate itineraries that are likely to be of interest to a consumer based at least in part on the number of candidate itineraries having highest suitability scores. In at least some examples, if more than one candidate itinerary is determined to likely be of interest to a consumer, the itinerary determination module 222 may rank individual candidate itineraries based at least in part on suitability scores and/or ratings associated with the candidate itineraries.

Block 614 illustrates causing the itinerary to be presented to the user 106 (e.g., consumer). The presentation module 124 and/or the itinerary determination module 222 may generate user interfaces configured to recommend an itinerary 132 to a consumer and the presentation module 124 may cause the user interfaces to be presented to the consumer via a display of a device 108. In some examples, the user interfaces may be configured to provide functionality for the consumer to view a recommended itinerary and/or acquire the one or more items associated with the recommendation, as described below in FIG. 7B. Additionally and/or alternatively, the presentation module 124 may cause the user interfaces to be presented to the consumer via a text message, an email, a push notification, etc. The presentation module 124 may cause user interfaces to be presented to a consumer in predetermined time intervals, at a predetermined frequency, on or before a date and/or time, etc.

Block 618 illustrates receiving feedback associated with the itinerary, as described above. In at least one example, the presentation module 124 and/or feedback module 122 may generate a user interface configured to receive input and/or feedback associated with previously recommended itineraries 132, as described below in FIG. 7C. The feedback module 122 may access, receive, and/or determine feedback associated with attractions and/or itineraries 132. The feedback module 122 may receive feedback data from consumers (e.g., user 106). The feedback data may include a type of feedback (e.g., positive, neutral, negative) and may include feedback provided directly from consumers, user ratings relating to items, itineraries, and/or merchants, user reviews of items, itineraries, and/or merchants, user responses to surveys and/or questionnaires, customer service feedback, information from sites (i.e., websites), and so on. In some examples, the feedback data may be express feedback data, for instance, from user ratings relating to items, itineraries, and/or merchants, user reviews of items, itineraries, and/or merchants, user responses to surveys and/or questionnaires, customer service feedback, information from sites (i.e., websites), and so on. In other examples, the feedback data may be implied feedback data.

FIG. 7A is a diagram showing an example user interface 700 that may be presented via a display 702 of a device 108 associated with a user 106 (e.g., consumer) to receive user input in generating an itinerary 132. As described above, the generation module 118 may generate an itinerary 132 based at least in part on content items 130 accessed and/or received from devices 108 associated with a community of users 106 (e.g., consumers). In at least one example, a community of consumers may be a community of consumers who have retail purchase accounts with the service provider 102, subscribe to services offered by the service provider 102, etc.

As described above, the attraction determination module 210 may determine that a consumer is staying at a particular hotel and dates corresponding to the consumer's stay at the hotel. As illustrated in FIG. 7A, the attraction determination module 210 may determine that the consumer is staying at the Olive 8 in Seattle, Wash. Based at least in part on determining one or more attractions visited by a device 108 associated with a consumer and an order that the device 108 corresponding to the consumer traveled between the one or more attractions, the itinerary determination module 214 may generate at least a partial itinerary.

FIG. 7A illustrates a non-limiting example of a partial itinerary including:
 10:00 AM Kayak on Lake Union
 12:00 PM Lunch as Cactus in South Lake Union
 2:00 PM Pike Place Market
 5:00 PM Pyramid Brewery
 6:00 PM Seattle Mariners v. New York Yankees at Safeco Field.

As shown, user interface 700 may include one or more mechanisms for requesting additional information from the consumer to complete the partial itinerary and/or determine a rating associated with the itinerary. As illustrated in FIG. 7A, the user interface 700 may include mechanisms for rating each attraction (e.g., mechanism 704), mechanisms for providing free-form answers (e.g., mechanism 706), etc. Additionally and/or alternatively, the user interface 700 may include a mechanism to rate the entire itinerary (e.g., mechanism 708). Furthermore, in some examples, the itinerary determination module 214 may extract images, videos, etc. from content items 130 associated with the consumer and/or device 108 and may supplement the partial itinerary with images, videos, etc. In other examples, the user interface 700 may include a mechanism (e.g., mechanism 710) to enable a consumer to upload one or more additional images, videos, etc. (e.g., images and/or photos that the consumer did not include in content items 130, for example). The user interface 700 may include a mechanism 712 to enable a consumer to submit his or her input and/or feedback. FIG. 7A is a non-limiting example of a user interface that may be caused to be presented by the review module 216 that is configured to present a partial itinerary with one or more mechanisms to enable a consumer to generate a complete the itinerary 130 and/or provide feedback associated with the individual attractions and/or itinerary and additional and/or alternative configurations and/or mechanisms may be used to accomplish the same result.

FIG. 7B is a diagram showing an example user interface 714 that may be presented via a display 702 of a device 108 associated with a user 106 (e.g., consumer) to present an itinerary 132 to the user 106 (e.g., consumer). As described above, the destination determination module 220 may determine an intended destination associated with a consumer. For instance, the destination determination module 220 may determine an accommodation, city, state, country, etc. that a consumer intends to travel to. Based at least in part on determining the destination, the itinerary determination module 222 may access the user profiles 134 and the itineraries 132 in the database 128 to determine one or more itineraries 132 to recommend to the consumer. In FIG. 7B, user interface 714 is a non-limiting example of a user interface configured to present a completed itinerary 132 to the consumer. As illustrated, user interface 714 may include the intended destination (e.g., Olive 8, Seattle, Wash.) and may include one or more attractions and a suggested route for visiting the one or more attractions. As illustrated, FIG. 7B presents the consumer with the following itinerary:
 10:00 AM Kayak on Lake Union
 12:00 PM Lunch as Cactus in South Lake Union
 2:00 PM Pike Place Market
 5:00 PM Pyramid Brewery
 6:00 PM Seattle Mariners v. New York Yankees at Safeco Field.

The presentation module 124 may access and/or receive data from the information determination module 208 and may supplement the user interface 704 with one or more mechanisms 716 to enable the consumer to learn additional information about an attraction, schedule a time to visit an attraction, purchase tickets and/or other admission to the attraction, etc. In at least one example, the one or more mechanisms 716 may be hyperlinks or overlays that may be actuated by the consumer to provide additional information about the attraction, schedule a time to visit the attraction, purchase tickets and/or other admission to the attraction, etc.

In some examples, a consumer may actuate a single mechanism 718 to accept the recommended itinerary 132.

Based at least in part on accepting a recommended itinerary, any actions that may be necessary to visit each of the attractions via the route recommended by the itinerary determination module 224 may be executed. For instance, the service provider 102 may reserve kayaks at Moss Lake for kayaking at 10 am per the recommended itinerary 132. Further, the service provider 102 may make a reservation for 12 pm at Cactus in South Lake Union, per the recommended itinerary 132. Moreover, the service provider 102 may purchase Seattle Mariners' tickets, as recommended in the itinerary 132. In such examples, a retail purchase account associated with the consumer and/or user profile may be charged for any fees associated with the attractions, or a consumer may be prompted with a new user interface configured to enable the consumer to input additional information (e.g., banking information, special requests, etc.). Additionally and/or alternatively, the service provider 102 may insert applicable dates into a user's electronic calendar 106 on his or her device 108 and/or insert directions into an electronic note taking application on a user's 106 device 108.

As illustrated in FIG. 7B, the itinerary 132 may be associated with a rating 720. The user interface 714 may visually depict the rating 720. In FIG. 7B, the recommended itinerary is a five (5) star itinerary, indicating that it is a popular itinerary as determined based at least in part on receiving user feedback associated with the itinerary 132 and/or individual attractions. As described above, the rating 720 may be based on ratings of individual attractions associated with the itinerary 132 or the itinerary 132, as described above. The rating 720 may be updated based at least in part on feedback data received by the review module 216 and/or the feedback module 122. Furthermore, the user interface 714 may include a mechanism 722 that may be actuated such to cause reviews associated with the itinerary to be presented via the display 702.

FIG. 7B is a non-limiting example of a user interface that may be caused to be presented by the presentation module 124. Additional and/or alternative user interfaces may be utilized to present recommended itineraries 132 to users 106.

FIG. 7C is a diagram showing an example user interface 724 that may be presented via a display 702 of a device 108 associated with a user 106 (e.g., consumer) to receive user feedback regarding an itinerary 132 recommended to the user 106. Based at least in part on causing an itinerary 132 to be presented via a user interface such as user interface 714, the feedback module 122 may cause a user interface 724 to be presented via the presentation module 124. The user interface 724 may be configured to obtain structured feedback from a consumer. The user interface 724 may include various mechanisms to enable users 106 to rate individual attractions (e.g., mechanism 726A) and/or the complete itinerary 132 (mechanism 726B). Additionally and/or alternatively, the user interface 724 may include additional and/or alternative mechanisms 728 to enable users 106 to provide freeform feedback as a review. One or more additional mechanisms may be included in user interface 724 such as a mechanism to enable a user to individual users 106 to share the itinerary 132 (e.g., mechanism 730), provide freeform feedback in the form of a comment about the complete itinerary 132 (e.g., mechanism 732), etc. Resulting feedback data may be utilized by the feedback module 122 to make adjustments to ratings corresponding to the itineraries 132.

FIG. 7C is a non-limiting example of a user interface that may be caused to be presented by the presentation module 124. Additional and/or alternative user interfaces may be utilized to obtain ratings, review, comments, etc. from users 106.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
a memory that stores one or more computer-executable instructions that are executable by the one or more processors to cause the system to perform operations comprising:
  determining a travel destination associated with a first user based at least in part on a first reservation for an accommodation;
  accessing content items created by the first user at the travel destination via a first mobile computing device corresponding to the first user, the content items including videos, and at least one of images, social media posts, or microblog posts;
  analyzing each of the content items including videos to determine whether each content item includes a first attraction;
  identifying the first attraction in a number of content items of the content items created by the first user;
  determining that the number of content items meets or exceeds a predetermined threshold;
  generating, based at least in part on the first attraction, geolocation data, time data, and date data corresponding to the content items, an itinerary that includes a plurality of attractions associated with the travel destination visited by the first mobile computing device and a route in which the first mobile computing device visited the plurality of attractions;
  mapping, in a database, the itinerary to the travel destination;
  determining previously generated itineraries associated with the travel destination;
  determining a similarity score that represents a similarity between the itinerary and individual ones of the previously generated itineraries, the similarity score based, at least in part, on a route associated with the itinerary and routes corresponding to the individual ones of the previously generated itineraries;
  determining the itinerary is not duplicative of the previously generated itineraries based at least in part on the similarity score;
  determining, based at least in part on a second user making a second reservation for the accommodation, an intended travel destination associated with the second user that corresponds to the travel destination;
  determining a suitability score associated with the itinerary based, at least in part, on determining the itinerary is not duplicative of the previously generated itineraries and identifying the first attraction in the itinerary, the suitability score indicating a likelihood that the itinerary is of interest to the second user;
  selecting the itinerary to be presented to the second user based at least in part on the suitability score;

generating a user interface configured to present the itinerary to the second user via a second mobile computing device corresponding to the second user; and causing the user interface to be presented to the second user via the second mobile computing device.

2. The system of claim 1, wherein determining the suitability score comprises:

accessing, from the database, a plurality of candidate itineraries associated with the travel destination;

determining an individual suitability score for each candidate itinerary of the plurality of candidate itineraries based at least part on the intended travel destination, a date associated with travel to the intended travel destination, a season associated with the travel, a duration of the travel, a number of people travelling together to the intended travel destination, and at least one of interests or preferences associated with the user; and selecting a candidate itinerary of the plurality of candidate itineraries having a highest individual suitability score as the itinerary.

3. The system of claim 1, the operations further comprising:

generating a second user interface configured to prompt the second user for feedback associated with the itinerary;

causing the second user interface to be presented to the second user via the second mobile computing device; and incorporating at least some of the feedback into a third user interface configured to present the itinerary to a third user via a third mobile computing device corresponding to the third user.

4. A method comprising:

determining a travel destination associated with a user;

accessing, by a computing system, content items associated with the user at the travel destination;

identifying, by the computing system, a first attraction in a number of content items of the content items associated with the user;

determining, by the computing system, that the number of content items exceeds a predetermined threshold;

determining, by the computing system, at least one of geolocation data, time data, or date data that correspond to the content items, and that are included as part of their respective content items;

generating, by the computing system, based at least in part on the first attraction and the at least one of geolocation data, time data, or date data corresponding to the content items, a partial itinerary that includes one or more attractions associated with the travel destination visited by a mobile computing device and a first route in which the mobile computing device visited the one or more attractions;

generating a user interface configured to present the partial itinerary to the user, the user interface configured to enable user input for generating a complete itinerary;

receiving, via the user interface, the user input; and determining, based at least in part on the user input, the complete itinerary from the partial itinerary, the complete itinerary including a plurality of attractions associated with the travel destination and a second route in which the mobile computing device visited the plurality of attractions.

5. The method of claim 4, wherein determining the travel destination associated with the user is based at least in part on at least one of:

a reservation for an accommodation at the travel destination;

at least one of user information or user actions associated with a retail purchase account corresponding to the user; or at least one of user information or user actions associated with third party content hosting sources and systems.

6. The method of claim 4, wherein the content items include at last one of images, videos, social media posts, or microblog posts.

7. The method of claim 4, further comprising:

determining previously generated itineraries associated with the travel destination;

determining a similarity score that represents a similarity between the complete itinerary and each previously generated itinerary of the previously generated itineraries; and determining that the complete itinerary is not duplicative of the previously generated itineraries based at least in part on the similarity score.

8. The method of claim 7, wherein the similarity score is based at least in part on at least one of:

a first similarity between the plurality of attractions in the complete itinerary and attractions in each of the previously generated itineraries;

a second similarity between the second route associated with the complete itinerary and routes corresponding to each of the previously generated itineraries;

a third similarity between a time of year associated with the complete itinerary and times of the year associated with each of the previously generated itineraries; or a fourth similarity between a length of travel associated with the complete itinerary and lengths of travel associated with each of the previously generated itineraries.

9. The method of claim 7, further comprising determining that the complete itinerary is not duplicative of the previously generated itineraries based at least in part on a determination that the similarity score is at least one of below a threshold similarity score or outside of a predetermined range of similarity scores.

10. The method of claim 4, further comprising:

determining that an intended travel destination associated with a second user corresponds to the travel destination;

determining that the complete itinerary is likely to be of interest to the second user; and causing the complete itinerary to be presented to the second user via a second mobile computing device corresponding to the second user.

11. The method of claim 10, further comprising:

generating a second user interface configured to prompt the second user for feedback associated with the complete itinerary;

causing the second user interface to be presented to the second user via the second mobile computing device; and receiving, via the second user interface, the feedback from the second mobile computing device, the feedback associated with at least one attraction of the plurality of attractions or the complete itinerary.

12. The method of claim 11, further comprising incorporating at least some of the feedback into a third user interface configured to present the complete itinerary to a third user via a third mobile computing device corresponding to the third user.

13. The method of claim 11, further comprising adjusting a rating for the complete itinerary based at least in part on the feedback associated with the at least one attraction or the complete itinerary.

14. A system comprising:
one or more processors; and
a memory that stores one or more computer-executable instructions that are executable by the one or more processors to cause the system to perform operations comprising:
  determining an intended travel destination associated with a user;
  analyzing each of content items associated with the user at the intended travel destination, including at least image data, to determine whether each content item includes a first attraction;
  identifying the first attraction in a number of the content items associated with the user at the intended travel destination, wherein the number satisfies a predetermined threshold number;
  accessing, from a database, previously generated candidate itineraries that are associated with the intended travel destination and the first attraction;
  determining a candidate itinerary based at least in part on at least one of the previously generated candidate itineraries and the content items;
  determining the candidate itinerary is not duplicative of the previously generated candidate itineraries based at least in part on a similarity score that represents a route similarity between the candidate itinerary and individual ones of the previously generated candidate itineraries;
  determining a suitability score associated with a candidate itinerary of the candidate itineraries based at least in part on determining that the candidate itinerary is not duplicative of the previously generated candidate itineraries and identifying the first attraction in the candidate itinerary, the suitability score indicating a likelihood that the candidate itinerary is of interest to the user;
  selecting the candidate itinerary as an itinerary to recommend to the user based at least in part on the suitability score; and
  causing the itinerary to be presented to the user via a mobile computing device corresponding to the user.

15. The system of claim 14, wherein determining the intended travel destination is based at least in part on at least one of:
  a reservation for accommodations at the intended travel destination;
  at least one of user information or user actions associated with a retail purchase account corresponding to the user; or
  at least one of user information or user actions associated with third party content hosting sources and systems.

16. The system of claim 14, the operations further comprising:
  accessing data associated with the user, the data including user information or user actions associated with at least one of a retail purchase account or third party content hosting sources and systems; and
  determining the suitability score associated with the candidate itinerary based at least in part on a similarity between the data associated with the user and the candidate itinerary.

17. The system of claim 14, wherein the previously generated candidate itineraries are generated from content items associated with users who have previously visited the intended travel destination.

18. The system of claim 14, the operations further comprising determining a rating associated with the itinerary based at least in part on ratings corresponding to individual attractions associated with the itinerary.

19. The system of claim 18, the operations further comprising:
  generating a user interface configured to enable the user to provide feedback associated with the itinerary;
  causing the user interface to be presented to the user via the mobile computing device;
  receiving, via the user interface, feedback data associated with at least one of the individual attractions or the itinerary; and
  adjusting the rating associated with the itinerary.

20. The system of claim 14, the operations further comprising generating a user interface that is configured to present the itinerary, the user interface including at least one of ratings or reviews associated with the itinerary from other users who have previously visited the intended travel destination.

* * * * *